United States Patent
Moriguchi et al.

(10) Patent No.: US 7,726,683 B2
(45) Date of Patent: Jun. 1, 2010

(54) STROLLER

(75) Inventors: Kentaro Moriguchi, Nishi-Tokyo (JP);
Junichi Asano, Saitama (JP); Kenji Ishii, Koga (JP); Katsuhiro Iwata, Matsudo (JP); Go Nishida, Kokubunji (JP)

(73) Assignee: Combi Corporation, Tokyo (JP)

( * ) Notice: Subject to any disclaimer, the term of this patent is extended or adjusted under 35 U.S.C. 154(b) by 561 days.

(21) Appl. No.: 11/528,458

(22) Filed: Sep. 28, 2006

(65) Prior Publication Data

US 2007/0132207 A1    Jun. 14, 2007

(30) Foreign Application Priority Data

| Sep. 30, 2005 | (JP) | ............................. 2005-288302 |
| Sep. 30, 2005 | (JP) | ............................. 2005-288303 |
| Sep. 30, 2005 | (JP) | ............................. 2005-288309 |

(51) Int. Cl.
*B62B 7/08* (2006.01)
*B62B 3/02* (2006.01)

(52) U.S. Cl. .................................. 280/642; 280/47.38

(58) Field of Classification Search ................ 280/642, 280/644, 47.4, 47.41, 47.38, 647, 657, 658
See application file for complete search history.

(56) References Cited

U.S. PATENT DOCUMENTS

| 4,462,607 | A | * | 7/1984 | Nakao et al. | ................ 280/644 |
| 5,195,770 | A | * | 3/1993 | Ishikura | ...................... 280/648 |
| 5,590,896 | A | * | 1/1997 | Eichhorn | .................... 280/642 |
| 5,752,738 | A | * | 5/1998 | Onishi et al. | .................. 297/61 |
| 6,508,605 | B1 | * | 1/2003 | Cheng | ......................... 403/83 |
| 2004/0140648 | A1 | * | 7/2004 | Takubo et al. | ............... 280/642 |
| 2004/0164523 | A1 | * | 8/2004 | Kassai et al. | ................ 280/650 |

FOREIGN PATENT DOCUMENTS

CN    1130582 A    9/1996

* cited by examiner

*Primary Examiner*—Paul N Dickson
*Assistant Examiner*—Bryan A Evans
(74) *Attorney, Agent, or Firm*—Birch, Stewart, Kolasch & Birch, LLP

(57) ABSTRACT

A lightweight stroller 10 is provided. The stroller 10 includes front legs 12, rear legs 14, a seat support frame 70 connected to the front legs 12, a backrest support frame 34 connected to the seat support frame 70, a headrest plate 52 connected to an upper part of the backrest support frame, and a pair of side plates 50 disposed on the opposite sides, respectively, of the backrest support frame 34. A base sheet can be stably hold by the backrest support frame 34, the headrest plate 52 and the side plates 50 without increasing the length of connecting rods.

10 Claims, 13 Drawing Sheets

STROLLER

CROSS REFERENCE TO RELATED APPLICATIONS

This application is based upon and claims the benefit of priority from the prior Jpn. Pat. App. Nos. 2005-288302 filed on Sep. 30, 2005, 2005-288303 filed on Sep. 30, 2005 and 2005-288309 filed on Sep. 30, 2005, the entire contents of which are incorporated herein by reference.

BACKGROUND OF THE INVENTION

1. Field of the Invention

The present invention relates to a stroller and more particularly to a lightweight stroller.

The present invention relates to a foldable stroller and, more particularly, to a stroller including components wherein the continued ratio of the distances between the axes of the components is adjusted so that the stroller is formed in a small lightweight structure and excellent in operability, running stability, safety and ride comfort.

2. Description of the Related Art

A known stroller for carrying a baby when a person goes out with the baby for a walk or shopping is foldable when necessary to facilitate storing or carrying the stroller.

FIG. 13 is a partly cutaway perspective view of a stroller having a body structure provided with a base sheet. The body structure of the stroller includes right and left front legs 12 respectively holding front wheels 11, right and left rear legs 14 respectively holding rear wheels 13, a substantially U-shaped handle 15, right and left armrests 16, and right and left connecting rods 17, such as pipes orb the like, extended parallel to each other. End parts of the armrests 16 are pivotally joined to the connecting rods 17, respectively.

Upper end parts of the front legs 12 are pivotally joined to front end parts of the armrests 16, respectively. A curved, bendable guard arm 18 is extended between and detachably attached to the front ends of the armrests 16. Upper end parts of the right and left rear legs 14 are pivotally joined to middle parts of the armrests 16, respectively. Each of brackets 19 having the shape of an inverted letter V has one end pivotally joined to a middle part of the rear leg 14 and a middle part to which a lower end part of the connecting rod 17 is pivotally joined.

A locking part is formed on the other end of each bracket 19. A locking member 20 is mounted on the connecting rod 17. The locking member 20 is slidable along the connecting rod 17. The locking member 20 is engaged with the locking part of the bracket 19 so as to keep the stroller in an unfolded state.

A front stay 22 is provided with a footrest 21 and has opposite ends respectively connected to the right and left front legs 12. A rear stay 23 has opposite ends respectively connected to the right and left rear legs 14. Each of side members 24 has a front end part pivotally joined to a middle part of the front leg 12 and a rear end part pivotally joined to the lower end part of the connecting rod 17 together with both the bracket 19 and a lower end part of the handle 15. A transversely extended upper stay 25 has opposite end parts connected to middle parts of the side members 24, respectively.

The stroller can be maintained in an unfolded state for use by engaging the locking members 20 mounted on the connecting rods 17 with the locking parts of the brackets 19. The locking members 20 can be disengaged from the locking parts of the brackets 19 by operating an operating device 26 mounted on the handle 15. After the locking members 20 have been disengaged from the locking parts of the brackets 19, the stroller can be folded by turning the connecting rods 17 relative to the brackets 19. When the stroller is thus folded in a doubly fold state, the front legs 12 and the rear legs 14 are substantially parallel to each other. The longitudinal dimension of the stroller is reduced by folding the stroller. The stroller in the folded state is suitable for carrying and storage.

The base sheet 27 having a seat plate part 27a and a backrest part 27b is mounted on the body structure of the stroller. The seat plate part 27a of the base sheet 27 is mounted on the upper stay 25. The backrest part 27b has right and left side parts attached to upper parts of the connecting rods 17 extending upward from the joints of the connecting rods 17 and the armrests 16, respectively. When necessary, a baby seat fabricated by sewing, not shown, is mounted on the base sheet 27. A baby is laid in a sitting position or lying position on the baby seat when the stroller is moved.

By the way, the stroller needs to be lifted up, for example, when the person using the stroller goes up stairs. Therefore, weight reduction is one of important problems in designing the stroller.

However, in this known stroller, the side parts of the backrest part 27b of the base sheet 27 are supported on the connecting rods 17 in a hammock manner as mentioned above. As shown in FIG. 13, the right and left side parts of the backrest part 27b are attached to the upper parts of the connecting rods 17 extending upward from the joints of the connecting rods 17 and the armrests 16, respectively. Therefore, the connecting rods 17 are inevitably long and increase the weight of the stroller.

The seat plate part 27a and the backrest part 27b of the base sheet 27 need to be rigid. Therefore, the seat plate part 27a and the backrest part 27b, which are sewn articles, need to be reinforced by core plates, respectively. Therefore, the enhancement of the rigidity of the seat plate part 27a and the backrest part 27b entails increase in weight. A sheet formed by sewing needs to be a bag in order to insert a core plate in the sheet.

The stroller needs to be capable of stably running (running stability), of being easily operated (operability), of safely carrying a baby (safety) and of giving comfortableness (ride comfort) in addition to being small and lightweight. Most strollers in use in those days are unfoldable in an adequate state for carrying a baby and foldable in an adequate state for storage. The stroller is desired to be easily foldable in a small size (facility for folding).

The component members of the foldable stroller are pivotally joined in order to make the stroller foldable. Therefore, the continued ratio of the distances between the turning axes of the component members is determined to insure a folding operation. The foldable construction of the stroller places restrictions on the advance of the miniaturization, operability, running stability, safety and ride comfort of the stroller.

SUMMARY OF THE INVENTION

It is therefore an object of the present invention to solve the problems in known strollers and to provide a lightweight stroller.

Another object of the present invention is to provide a stroller including component members arranged with the distances between the axes of turning of thereof in a proper continued ratio so that operability, running stability, safety and ride comfort may be improved, and capable of being folded in a small size.

A stroller in a first aspect of the present invention comprises: a leg; seat support frame connected to the leg; a backrest support frame connected to the seat support frame; a headrest plate connected to an upper part of the backrest support frame; and a pair of side plates disposed on the opposite sides, respectively, of the backrest support frame.

In the stroller in the first aspect of the present invention, a base sheet can be securely held by the backrest support frame, the headrest plate and the side plates. Therefore, right and left side parts of the base sheet do not need to be connected to connecting rods (connecting members). Thus the connecting rods may be short and hence the stroller is lightweight.

In the stroller in the first aspect of the present invention, the side plates may be connected to both the seat support frame and the headrest plate.

In the stroller in the first aspect of the present invention, the side plates may be connected to both the seat support frame and the headrest plate so as to be turnable, and the backrest support frame may be connected to both the seat support frame and the headrest plate so as to be turnable.

In the stroller in the first aspect of the present invention, an axis about which the side plates turn relative to the seat support frame may be positioned at a level higher than a level at which an axis about which the backrest support frame turns relative to the seat support frame is positioned.

In the stroller in the first aspect of the present invention, the headrest plate may be adapted to turn relative to the backrest support frame by turning the backrest support frame relative to the seat support frame. Preferably, the headrest plate turns (swings) in a rising direction relative to the backrest support frame when the backrest support frame is turned (swung) in a falling direction (a downward direction) relative to the seat support frame, and the headrest plate turns (swings) in a falling direction relative to the backrest support frame when the backrest support frame is turned (swung) in a rising direction (a upward direction) relative to the seat support frame.

In the stroller in the first aspect of the present invention, pins may be projected transversely from one of the headrest plate and the side plates, and the other of the side plates and the headrest plate may be provided with slots in which the pins engage.

The stroller in the first aspect of the present invention may further comprise a base sheet supported by the seat support frame and the backrest support frame. The base sheet can be thus stretched tautly and hence a core plate for providing the base sheet with rigidity can be omitted in order to reduce the weight of the stroller.

In such a stroller in the first aspect of the present invention, the backrest frame may include a pair of side frame parts, and a connecting frame part (rod part) connecting the pair of side frame parts, and the base sheet may be mounted on the seat support frame, the pair of side frame parts and the connecting frame part so as to be stretched tautly.

Alternatively, in such a stroller in the first aspect of the present invention, the seat support frame may include a pair of side member (side frame)s connected to the leg, and a front upper stay connecting the pair of side members, the backrest support frame may include a pair of side frame parts and a connecting frame part connecting the pair of side frame parts, and the base sheet may be mounted on the pair of side members, the front upper stay, the pair of side frame parts and the connecting frame part so as to be stretched tautly. The side members and the front upper stay of the seat support frame may be those included in a generally known stroller. Thus the number of component parts is not increased and the weight of the stroller can be effectively reduced. The stroller may further comprise: a rear upper stay connecting the pair of side members at a position behind the front upper stay; and a tightening member mounted on the rear upper stay and attached to the base sheet. The backrest support frame may be connected to the seat support frame so as to be turnable, and the rear upper stay may be positioned below an axis about which the backrest support frame turns relative to the seat support frame in a state where the stroller is unfolded.

A stroller in a second aspect of the present invention comprises: a leg; a seat support frame connected to the leg; a U-shaped backrest support frame connected to the seat support frame so as to be turnable; and a base sheet supported by the seat support frame and the backrest support frame.

In the stroller in the second aspect of the present invention, the base sheet can be thus stretched tautly and hence a core plate for providing the base sheet with rigidity can be omitted to reduce the weight of the stroller.

In the stroller in the second aspect of the present invention, the backrest frame may include a pair of side frame parts, and a connecting frame part (rod part) connecting the pair of side frame parts, and the base sheet may be mounted on the seat support frame, the pair of side frame parts and the connecting frame part so as to be stretched tautly.

Alternatively, in the stroller in the second aspect of the present invention, the seat support frame may include a pair of side member (side frame)s connected to the leg, and a front upper stay connecting the pair of side frames, the backrest support frame may include a pair of side frame parts and a connecting frame part connecting the pair of side frame parts, and the base sheet may be mounted on the pair of side members, the front upper stay, the pair of side frame parts and the connecting frame part so as to be stretched tautly. The side frame parts and the front upper stay of the seat support frame may be those included in a generally known stroller. Thus the number of component parts is not increased and the weight of the stroller can be effectively reduced. The stroller may further comprise: a rear upper stay connecting the pair of side members at a position behind the front upper stay; and a tightening member mounted on the rear upper stay and attached to the base sheet. The backrest support frame may be connected to the seat support frame so as to be turnable, and the rear upper stay may be positioned below an axis about which the backrest support frame turns relative to the seat support frame in a state where the stroller is unfolded.

A stroller in a third aspect of the present invention comprise: a connecting rod (connecting member); an armrest pivotally connected to an upper part of the connecting rod; a front leg pivotally connected to the armrest; a rear leg pivotally connected to the armrest; a side member (side frame) pivotally connected to a middle part of the front leg and a lower part of the connecting rod, respectively; and a handle pivotally connected to the connecting rod and the side member so as to be turnable about an axis about which the connecting rod and the side member turn relative to each other between a back side pushing position (a forward pushing position) where the handle extends obliquely upward and rearward and a face side pushing position (a rearward pushing position) where the handle extends obliquely upward and forward; wherein the stroller is foldable when the handle is set at the back side pushing position, the armrest and the connecting rod can turn relative to each other about a first axis, the armrest and the rear leg can turn relative to each other about a second axis, the side member and the front leg can turn relative to each other about a third axis, and the side member and the connecting rod can turn relative to each other about a fourth axis, and a distance A between the first and the second axis, a distance B between the second and the third axis, a distance C between the third and the fourth axis and a distance D between the fourth and the first axis meet a condition represented by a continued distance ratio:

A:B:C:D=1.5:1.6:1.7:1.5, which is rounded off to the first decimal place.

In the stroller in the third aspect of the present invention, operability, safety, running stability and comfortableness (ride comfort) can be improved and the stroller can be folded in a small size without increasing the size of the stroller and without increasing the number of component parts by properly adjusting the distances between those axes.

In the stroller in the third aspect of the present invention, it is preferable that, a straight line connecting the first and the fourth axis may be inclined, in a side view, at an angle between 53° and 63° to a surface on which the unfolded stroller is placed, in a state where the stroller is unfolded, and a straight line connecting the second and the third axis be inclined, in a side view, at an angle between 54° and 64° to a surface on which the unfolded stroller is placed, in a state where the stroller is unfolded. According to such a stroller, the front leg inclined at a proper angle to the surface is particularly effective in improving running stability. In addition, the connecting rod inclined at a proper angle to the surface is particularly effective in improving ride comfort. Preferably, the rear leg is inclined, in a side view, at an angle between 56° and 66° to the surface on which the stroller is placed, in a state where the stroller is unfolded. According to this stroller, the rear leg inclined at a proper angle to the surface is particularly effective in improving running stability.

The stroller in the third aspect of the present invention may further comprise a bracket pivotally connected to a middle part of the rear leg, the bracket also being connected to the lower part of the connecting rod so as to be turnable about the fourth axis, wherein the bracket and the rear leg can turn relative to each other about a fifth axis, and a distance E between the second and the fifth axis and a distance F between the fourth and the fifth axis meet a condition represented by a continued distance ratio:

A:B:C:D:E:F=1.5:1.6:1.7:1.5:1.9:1.0, which is rounded off to the first decimal place. According to this stroller, the fifth axis extended at a proper position in the stroller is effective in improving folding operability. Preferably, the connecting rod is inclined, in a side view, at an angle between 53° and 63° to the surface on which the stroller is placed, in a state where the stroller is unfolded, and the rear leg is inclined, in a side view, at an angle between 56° and 66° to the surface on which the stroller is placed, in a state where the stroller is unfolded. According to this stroller, the rear leg inclined at a proper angle to the surface is effective particularly in improving running stability. In addition, the connecting rod inclined at a proper angle to the surface is effective particularly in improving ride comfort. Furthermore, the angle between the front leg and the surface is determined automatically by determining the relative angle between the connecting rod and the rear leg. The front leg inclined at a proper angle to the surface is effective particularly in improving running stability.

In the stroller in the third aspect of the present invention, it is preferable that the handle set at the back side pushing position is substantially parallel to the connecting rod, the handle set at the back side pushing position is inclined, in a side view, at an angle between 53° and 63° to the surface on which the stroller is placed, in a state where the stroller is unfolded, and the handle set at the face side pushing position is inclined, in a side view, at an angle between 45° and 55° to the surface on which the stroller is placed, in a state where the stroller is unfolded. The handle at the face side pushing position and the connecting rod inclined at proper angles, respectively, to the surface are effective particularly in improving ride comfort.

A foldable stroller in a fourth aspect of the present invention comprise; a handle; an armrest pivotally connected to a middle part of side member (side frame) of the handle; a front leg pivotally connected to the armrest; a rear leg pivotally connected to the armrest; and a side member pivotally connected to both a middle part of the front leg and a lower part of the handle, respectively; wherein the stroller is foldable, the armrest and the handle can turn relative to each other about a first axis, the armrest and the rear leg can turn relative to each other about a second axis, the front leg and the side member can turn relative to each other about a third axis, and the side member and the handle can turn relative to each other about a fourth axis, and a distance A between the first and the second axis, a distance B between the second and the third axis, a distance C between the third and the fourth axis and a distance D between the fourth and the first axis meet a condition represented by a continued distance ratio:

A:B:C:D=1.5:1.6:1.7:1.5, which is rounded off to the first decimal place.

In the stroller in the fourth aspect of the present invention, operability, safety, running stability and comfortableness (ride comfort) can be improved and the stroller can be folded in a small size without increasing the size of the stroller and without increasing the number of component parts by properly adjusting the distances between those axes.

In the stroller in the fourth aspect of the present invention, it is preferable that, a straight line connecting the first and the fourth axis is inclined, in a side view, at an angle between 53° and 63° to a surface on which the unfolded stroller is placed, in a state where the stroller is unfolded, and a straight line connecting the second and the third axis is inclined, in a side view, at an angle between 54° and 64° to the surface on which the unfolded stroller is placed, in a state where the stroller is unfolded. The front leg inclined at a proper angle to the surface is particularly effective in improving running stability. The handle inclined at a proper angle to the surface is effective particularly in improving ride comfort. Preferably, the rear leg is inclined, in a side view, at an angle between 56° and 66° to the surface on which the stroller is placed, in a state where the stroller is unfolded. The rear leg inclined at a proper angle to the surface is particularly effective in improving running stability.

The stroller in the fourth aspect of the present invention may further comprise a bracket pivotally connected to a middle part of the rear leg, the bracket also being connected to the lower part of the handle so as to be turnable about the fourth axis, wherein the rear leg and the bracket are turnable relative to each other about a fifth axis, and a distance E between the second and the fifth axis and a distance F between the fourth and the fifth axis meet a condition represented by a continued distance ratio:

A:B:C:D:E:F=1.5:1.6:1.7:1.5:1.9:1.0, which is rounded off to the first decimal place. The fifth axis extended at a proper position in the stroller is effective in improving folding operability. Preferably, the handle is inclined, in a side view, at an angle between 53° and 63° to the surface on which the stroller is placed, in a state where the stroller is unfolded, and the rear leg is inclined, in a side view, at an angle between 56° and 66° to the surface on which the stroller is placed, in a state where the stroller is unfolded. The rear leg inclined at a proper angle to the surface is effective particularly in improving running stability. The handle inclined at a proper angle to the surface is effective particularly in improving ride comfort. The angle between the front leg and the surface is determined automatically by the angle between the handle and the rear leg. The front leg inclined at a proper angle to the surface is effective particularly in improving running stability.

DESCRIPTION OF THE PREFERRED EMBODIMENTS

Figure 13:
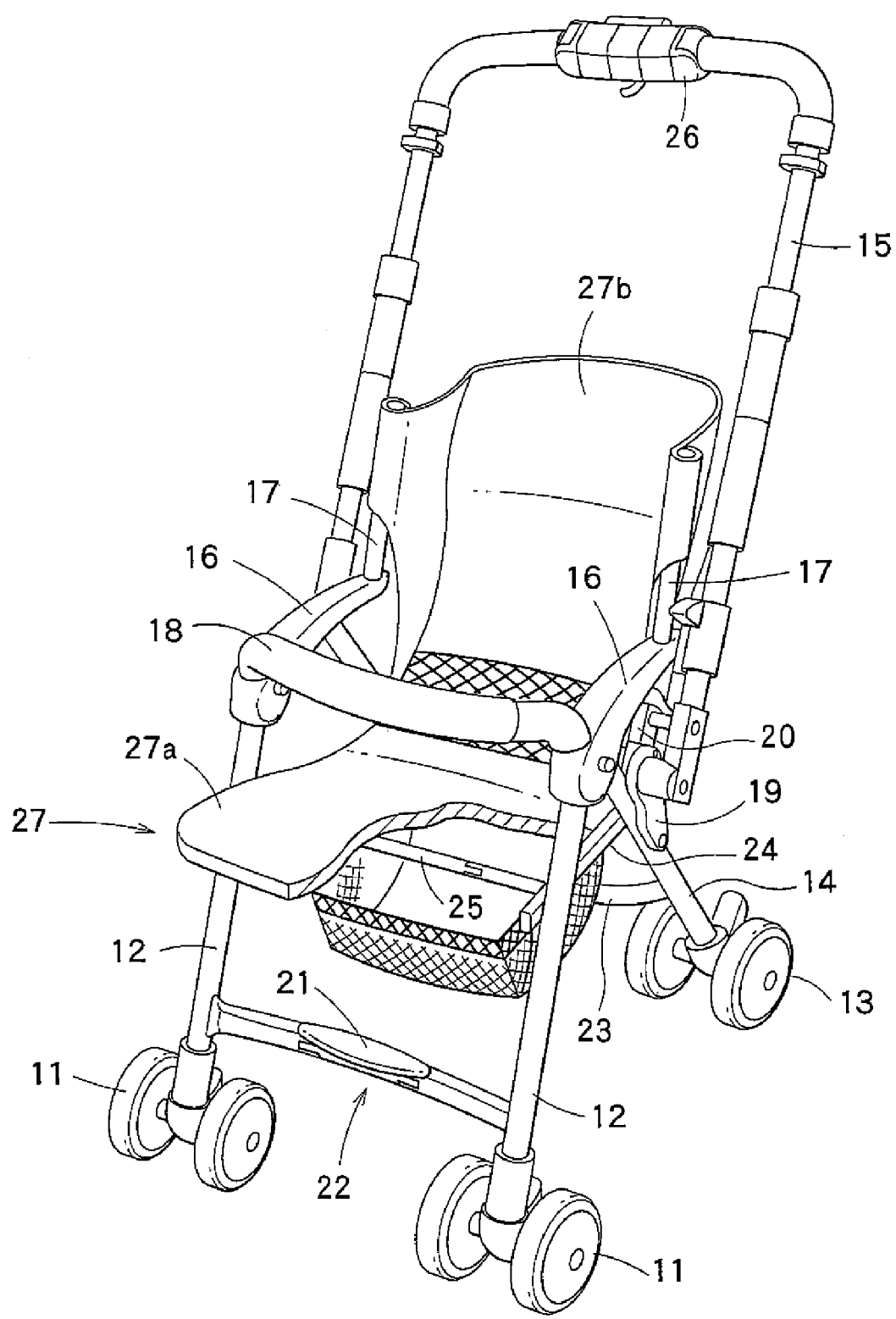
FIG. 13 is a partly cutaway perspective view of a known stroller.

Strollers in preferred embodiments according to the present invention will be described with reference to the accompanying drawings, in which parts like those of the stroller previously described with reference to FIG. 13 are designated by the same reference characters and the description thereof will be omitted to avoid duplication.

In this specification, the terms "front", "rear", "upper", "lower", "forward/rearward directions (longitudinal directions)", and "upward/downward directions" are used for expressing "front", "rear", "upper", "lower", "forward/rearward directions", and "upward/downward directions" with respect to an unfolded stroller 10 with its handle 15 set at a back side pushing position (a forward pushing position), respectively, unless otherwise specified. More specifically, "forward/rearward direction" with respect to the stroller 10 is direction parallel to a line extending between a lower left-hand part and an upper right-hand part of FIG. 1, and a "front" side in the "forward/rearward direction" corresponds to a lower left-hand side of FIG. 1. On the other hand, "upward/downward direction" with respect to the stroller 10 is perpendicular to the "forward/rearward direction" and parallel to a line extending between the top and the bottom of FIG. 1. The stroller 10 in the first embodiment is substantially symmetrical with respect to a vertical plane containing the longitudinal axis of the stroller 10 as shown in FIGS. 1 to 9.

Figure 1:
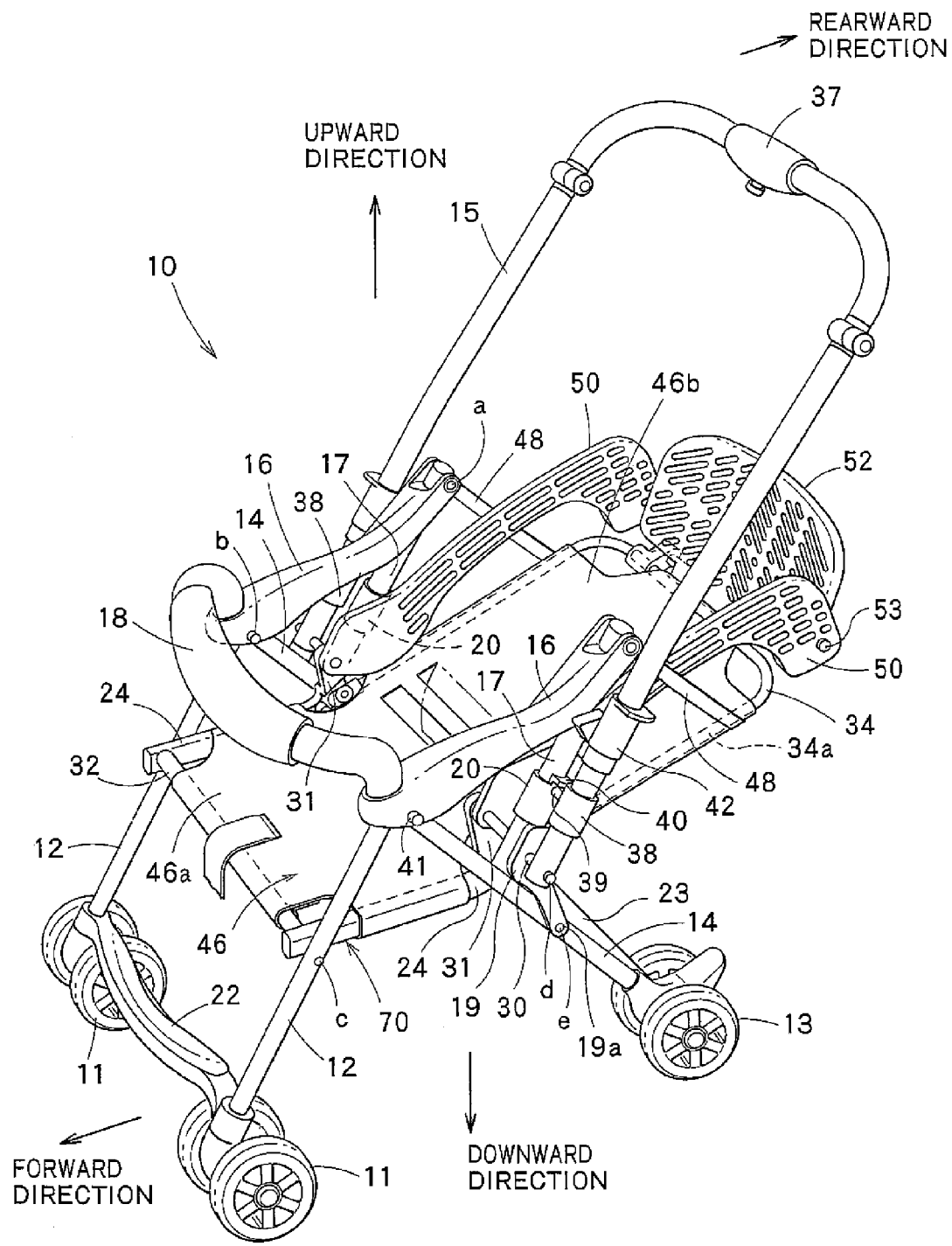
FIG. 1 is a schematic perspective view of a stroller in a first embodiment according to the present invention.
Figure 2:
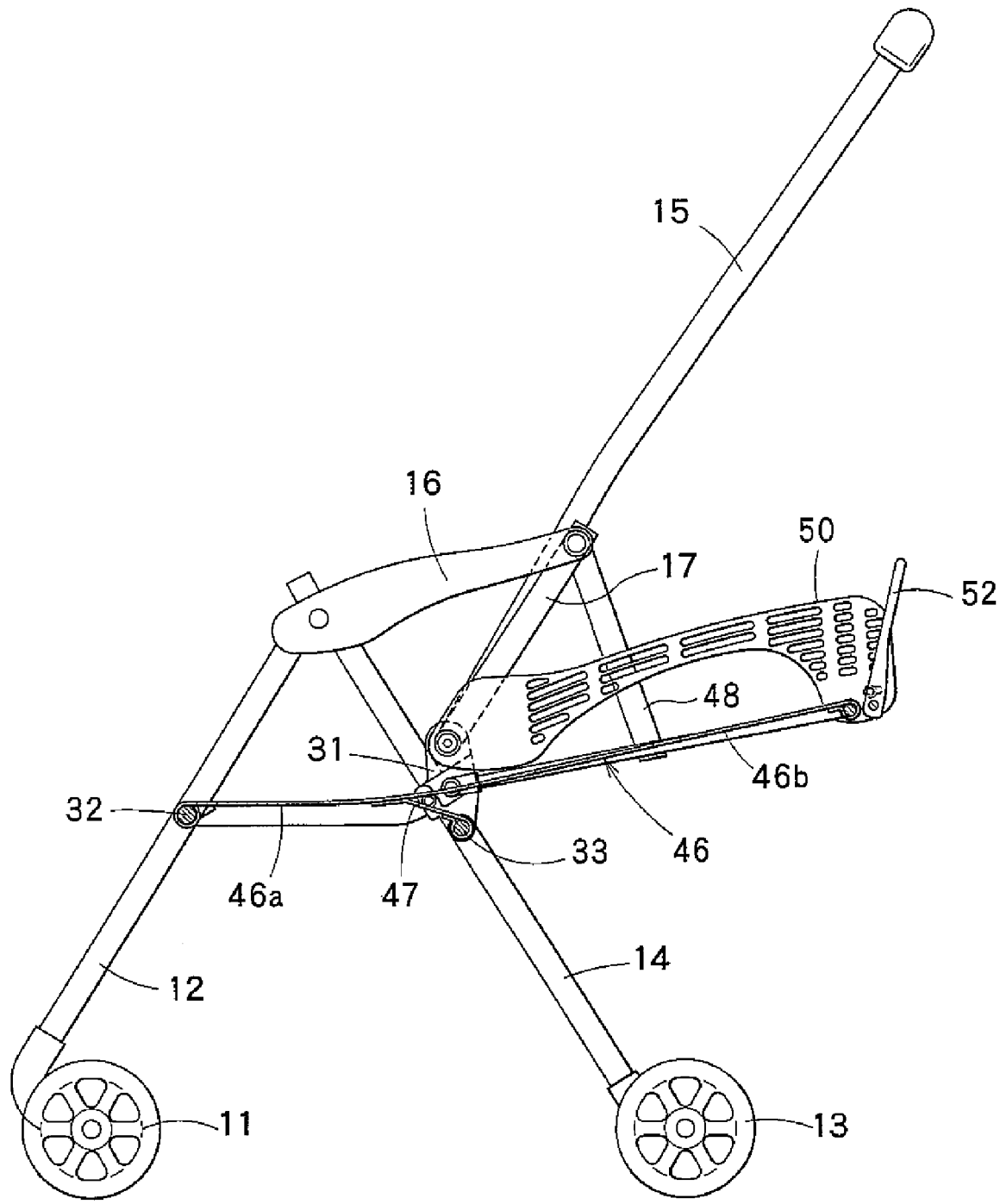
FIG. 2 is a longitudinal sectional view of the stroller shown in FIG. 1.

FIG. 1 is a schematic perspective view of the stroller 10 in the first embodiment and FIG. 2 is a longitudinal sectional view of the stroller 10. Referring to FIGS. 1 and 2, the stroller 10 in the first embodiment 10 includes right and left legs 12, right and left rear legs 14, a substantially U-shaped handle 15, right and left armrests 16, and right and left connecting rods (connecting member) 17 extending parallel to each other and having upper end parts pivotally joined to rear end parts of the armrests 16, respectively. The connecting rods 17 are, for example, aluminum pipes or the like. As stated below, the stroller 10 further includes other component members.

Referring to FIG. 1, upper end parts of the front legs 12 and the rear legs 14 are pivotally joined to front parts of the armrests 16, respectively, such that the front legs 12 and the rear legs 14 are turnable (swingable) relative to the armrests 16. Upper end parts of the connecting rods (side pipes) 17 are pivotally joined to rear end parts of the armrests 16, respectively, such that the connecting rods 17 are turnable (swingable) relative to the armrests 16. A front stay 22 supporting a footrest 21 has opposite ends connected to the right and the left front legs 12, respectively. A rear stay 23 has opposite ends connected to the right and the left rear legs 14, respectively. A lower end part of each of substantially V-shaped brackets 19 is supported on a shaft 19a attached to each of the rear legs 14 so as to be turnable (swingable) relative to the rear leg 14.

Figure 3:
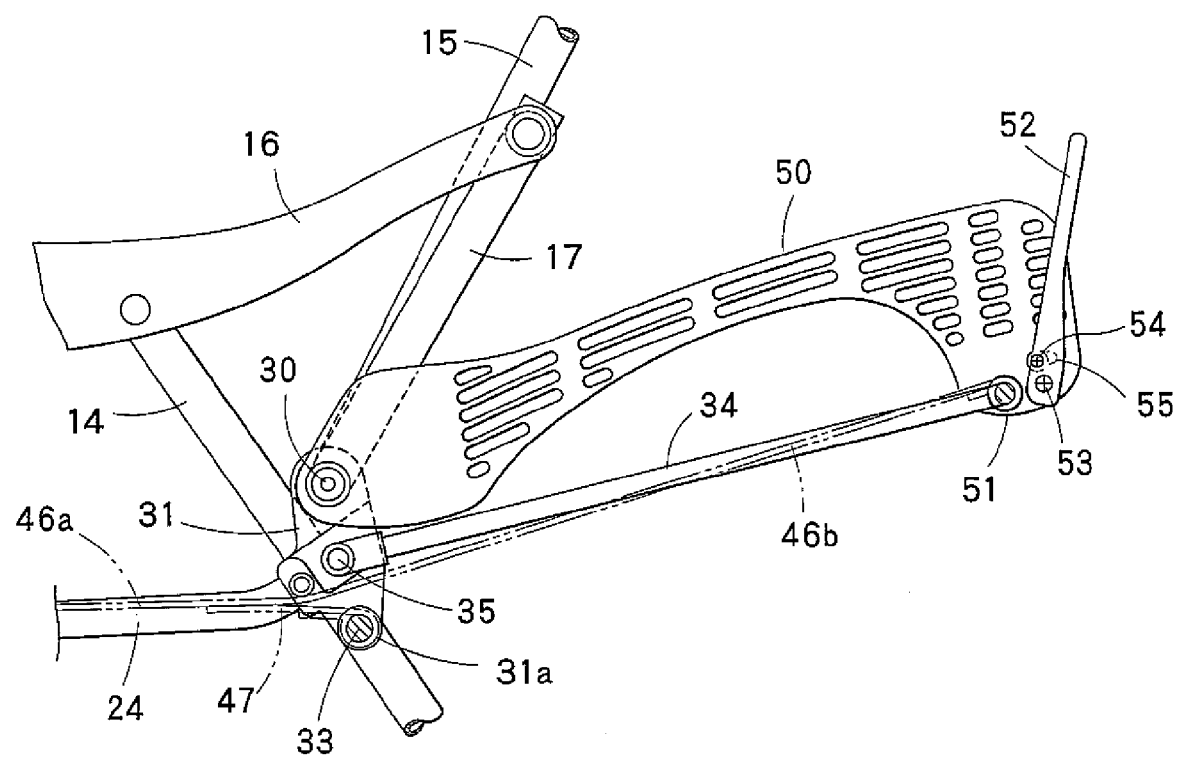
FIG. 3 is a fragmentary, enlarged view of a backrest support frame and a side plate included in the stroller shown in FIG. 1.

Referring to FIGS. 1 and 3, each bracket 19 has a middle part mounted on a shaft 30 held on a lower end part of the connecting rod 17 so as to be turnable (swingable) relative to each connecting rod 17 by the shaft 30. Each bracket 19 is connected to a frame holding member 31 disposed on the inner side of the lower end part of the connecting rod 17 so as to be turnable relative to the frame holding member 31 by the shaft 30. Each bracket 19 is connected to a lower end part, on the outer side of the bracket 19, of a side member of the U-shaped handle 15 so as to be turnable (swingable) relative to the lower end part of the side member by the shaft 30.

As shown in FIG. 1, front end parts of side members (side frames) 24 are pivotally joined to middle parts of the right and the left front legs 12, respectively, so as to be turnable (swingable) relative to the front legs 12. A front upper stay 32 has opposite ends connected to front end parts of the right and the left side members 24. As shown in FIG. 3, the rear end parts of the side members 24 are fixedly connected to middle parts of the frame holding members 31, respectively. In this embodiment, the right and the left side members 24, the front upper stay 32 and the frame holding members 31 form a seat support frame 70. As obvious from FIG. 1, the seat support frame 70 has a substantially angular U-shape.

Referring to FIG. 3, Each of the frame holding members 31 has an upper part connected to the shaft 30 on the upper side of the middle part fixedly connected to the side member 24 and a stay holding part 31a projecting downs on the lower side of the middle part. A rear upper stay 33 has opposite ends fixedly connected to the stay holding parts 31a. The right and left side members 24 are connected by the rear upper stay 33 through the right and left frame holding members 31.

Figure 4:
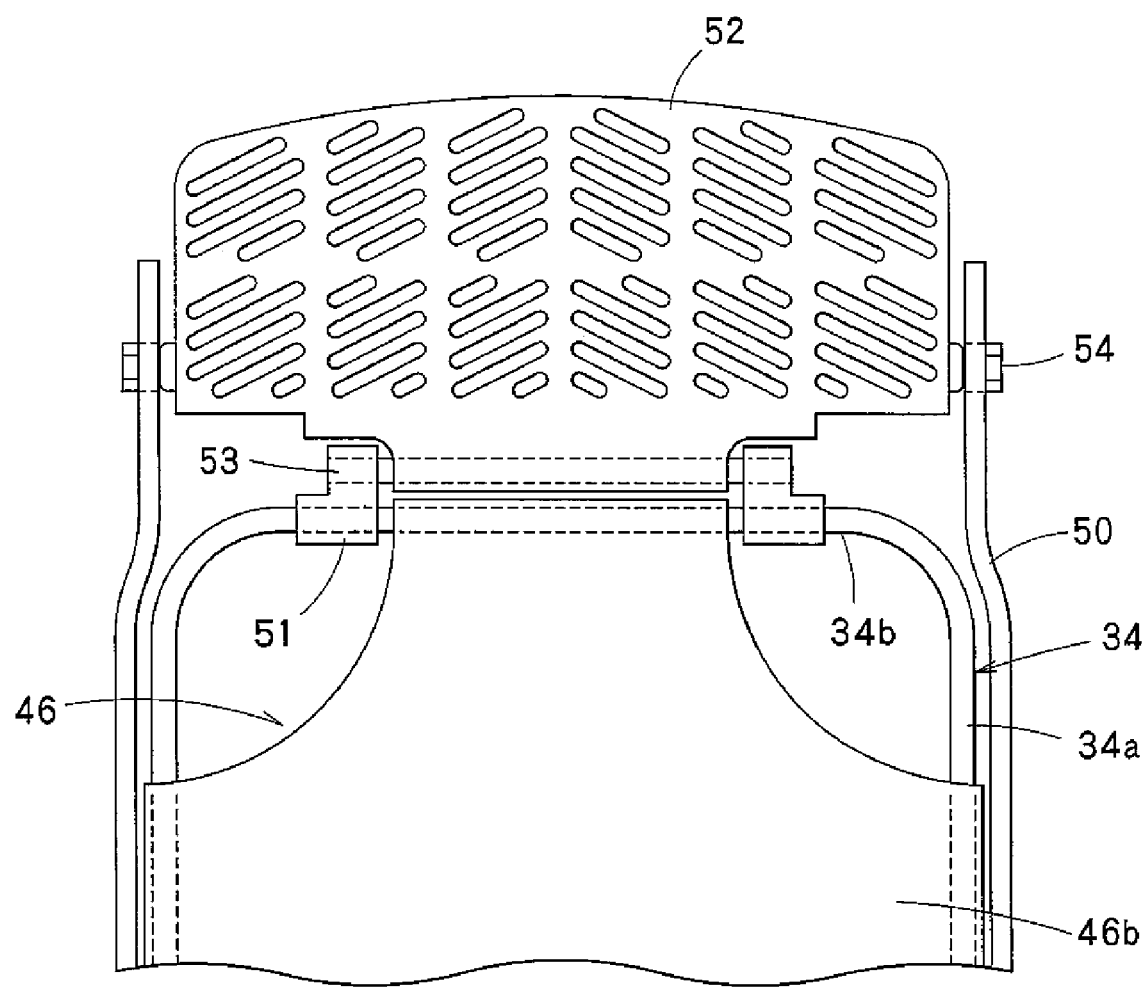
FIG. 4 is a view of the backrest support frame and a headrest plate included in the stroller shown in FIG. 1.
Figure 5:
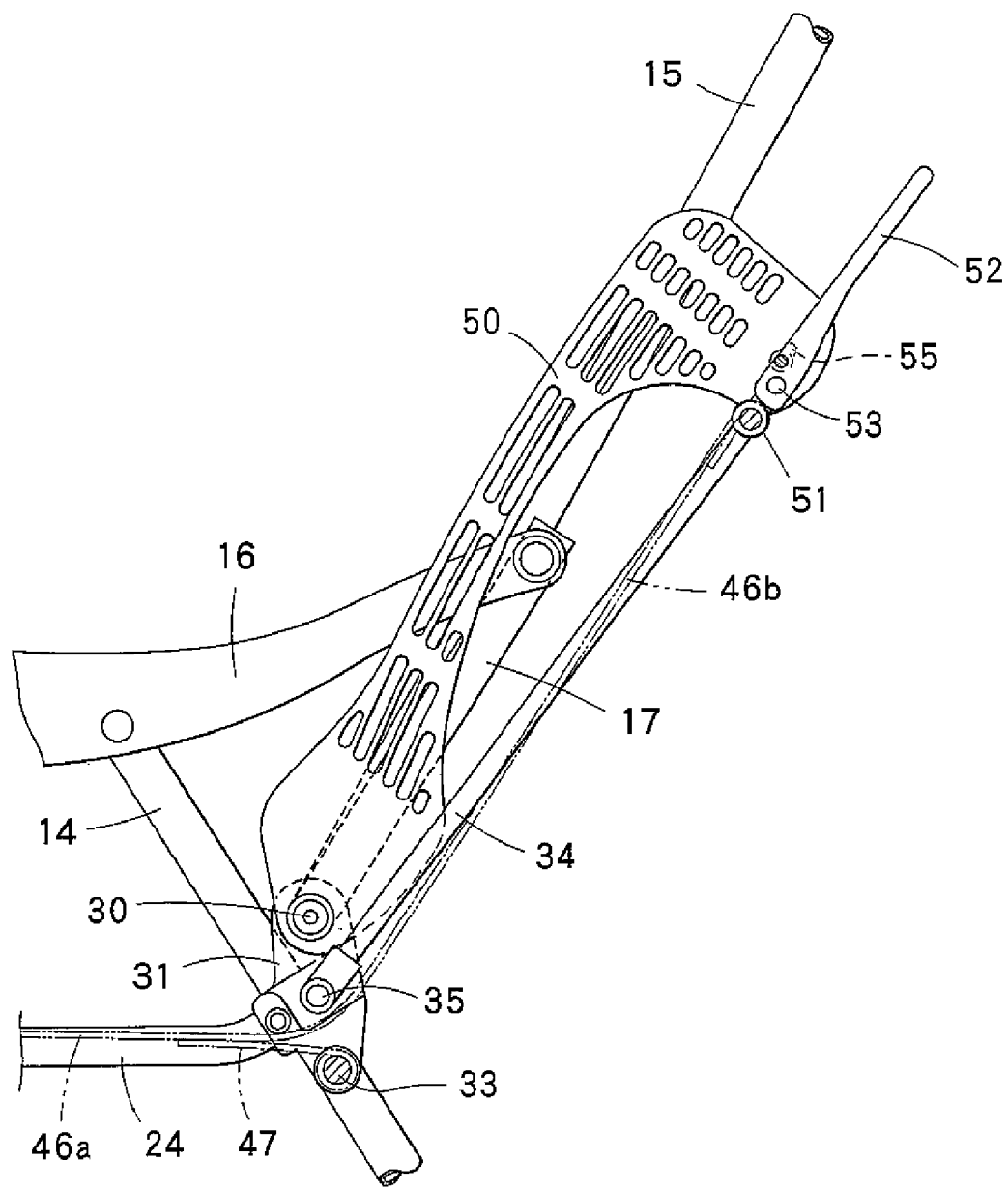
FIG. 5 is a view for explaining motions of the backrest support frame and the headrest plate when the stroller shown in FIG. 1 is folded.
Figure 6:
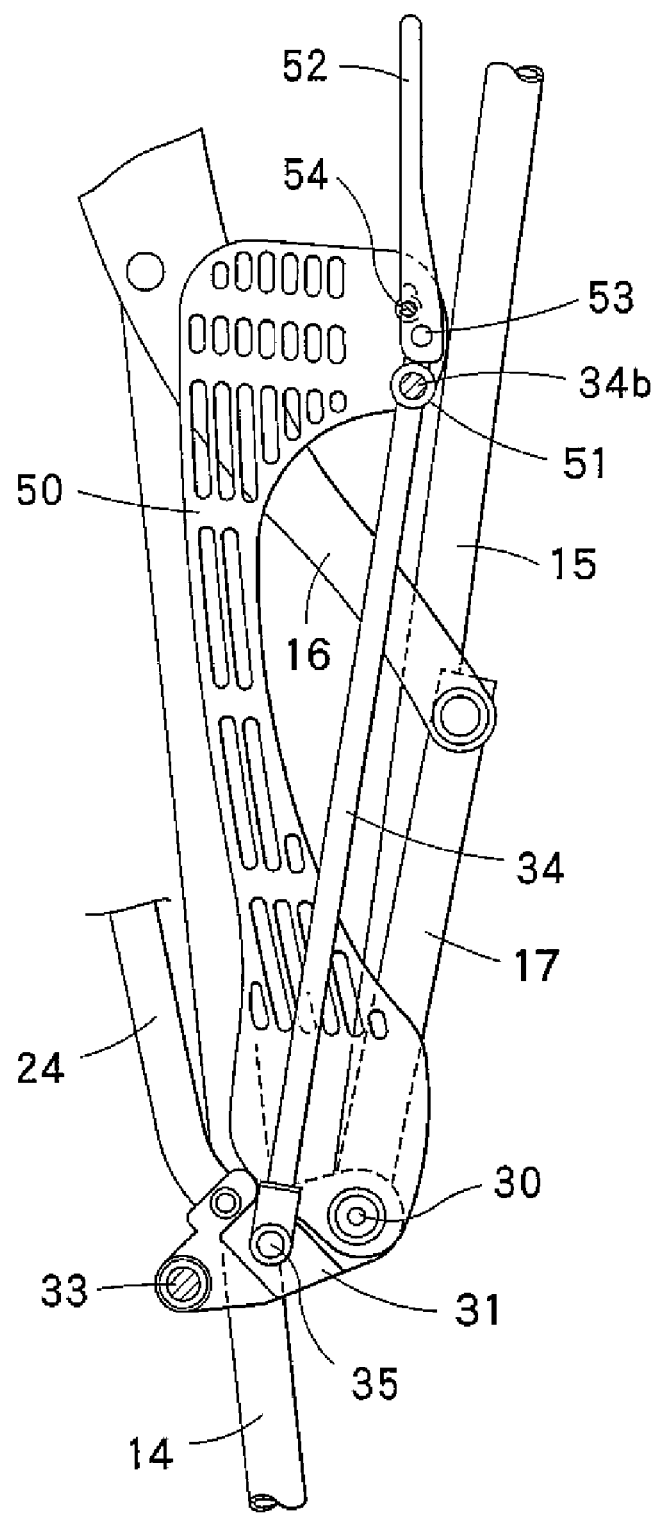
FIG. 6 is a view for explaining motions of the backrest support frame and the headrest plate when the stroller shown in FIG. 1 is folded.

A substantially U-shaped backrest support frame 34 is supported on parts, between the shaft 30 and the rear upper stay 33, of the right and the left frame holding members 31 by a shaft 35 so as to be turnable (swingable). As shown in FIGS. 1 and 4, the backrest support frame 34 has a pair of side frame parts (a pair of side frame members) 34a having lower end parts pivotally joined to the rear end parts of the side members 24, respectively, and a connecting frame member (a rod part, a horizontal top member) 34b extending between the side frame parts 34a. As shown in FIG. 1, the respective open ends of the substantially U-shaped seat support frame 70 and the substantially U-shaped backrest support frame 34 are connected together. That is to say, the substantially U-shaped seat support frame 70 and the substantially U-shaped backrest support frame 34 are disposed with their open ends of the U-shape facing to each other. The backrest support frame 34 is turnable (swingable) relative to the seat support frame 70 as shown in FIGS. 2, 5 and 6.

As mentioned above, the right and the left side members 24 and the front upper stay 32 having opposite ends respectively connected to the front end parts of the right and the left side members 24 form the substantially U-shaped seat support frame 70. A base sheet 46 is mounted and stretched on the seat support frame 70 and the backrest support frame 34 so as to cover a space surrounded by the seat support frame 70 and the backrest support frame 34. As shown in FIG. 1, the base sheet 46 has a seat part 46a. The seat part 46a has side edge parts connected to the side members 24, and a front edge part attached to the front upper stay 32. AS shown in FIGS. 1 and 4, the base sheet 46 has a backrest part 46b continuous with the seat part 46a. The backrest part 46b has side edge parts connected to the side frame parts 34a of the backrest support frame 34 and a rear edge part connected to the horizontal top member 34b extending between the side frame parts 34a. Thus the base sheet 46 is stretched tautly in both forward/rearward directions and transverse directions.

Referring to FIGS. 2 and 3, a base sheet tightening member 47 is sewn to the back surface of the base sheet 46, stretched on the seat support frame 70. As shown in FIGS. 3 and 5, the base sheet tightening member 47 is sewn to a boundary part, of the base sheet 46, between the rear end of the seat part 46a and the lower end of the backrest part 46b. The end part of the base sheet tightening member 47 is connected to the rear upper stay 33 which is below the shaft 35 supporting the backrest support frame 34 when the stroller 10 is unfolded as shown in FIG. 2. More strictly, the base end part of the base sheet tightening member 47 and the rear upper stay 33 are positioned below and behind a part of the backrest support frame 34 to which the base sheet tightening member is attached. Thus the base sheet 46 is pulled downward by the base sheet tightening member 47. Consequently, the base sheet part 46a and the backrest part 46b are pulled in four directions in order to ensure that the base sheet 46 is stretched tautly.

Reclining angle adjusting belts 48 are extended behind the backrest support frame 34 on which the base sheet 46 is stretched. Each of the reclining angle adjusting belts 48 has one end connected to the connecting rod 17. The reclining angle of the backrest part 46a can be adjusted by adjusting the length of the reclining angle adjusting belts 48.

The base sheet 46 can be maintained in a rigid state by tautly stretching the base sheet 46 in both forward/rearward directions and the transverse directions. Therefore, the base sheet does not need any reinforcement, such as a plate, which is needed by the known stroller, and hence the stroller 10 has a reduced weight. The rear upper stay 33 is disposed at a level lower than that at which the shaft on which the backrest support frame 34 turns relative to the seat support frame 70 is extended. Therefore, the buttocks of a baby can be prevented from touching the rear upper stay 33 even if the base sheet 46 is flexed by the baby's weight and hence the baby will not be bothered by an unpleasant feeling.

As shown in FIGS. 1 and 3, side plates 50 are disposed on the opposite sides, respectively, of the backrest support frame 34 to protect the baby. The side plates 50 are supported on the seat support frame 70 so as to be turnable (swingable) relative to the seat support frame 70. More specifically, the side plates 50 are connected to the frame holding members 31 and the connecting rods 17 by the shaft 30 so as to be turnable, as shown in FIG. 3. As shown in FIGS. 1 and 4, a headrest plate (headrest) 52 for protecting the baby's head is connected to an upper part of the backrest support frame 34. As shown in FIG. 4, a pair of support members 51 are put on the horizontal top member 34b extending between the right and the left side frame parts 34a and a shaft 53 is supported on the support members 51. The shaft 53 supports the headrest plate 52 by its lower part so that the headrest plate 52 is turnable (swingable) thereon.

Referring to FIGS. 3 and 4, pins 54 project transversely from right and left side parts of the headrest plate 52, respectively. Slots 55 are formed in the side plates 50, respectively. The pins 54 can be engaged in the slots 55 of the side plates 50, respectively. The headrest plate 52 can turn (rotate) on the pins 54 relative to the side plates 50. The pins 54 can slide along the slots 55 when the headrest plate 52 moves relative to the side plates 50. The side plates 50 may be provided with the pins 54 and the headrest plate 52 may be provided with the slots 55 in which the pins engage, respectively.

FIG. 3 shows a state where the backrest support frame 34 is reclined relative to the seat support frame 70 to lay the baby down on the stroller 10. In FIG. 3, the headrest plate 52 extends upward from a plane containing the backrest support frame 34, i.e., the sheet surface of the backrest part 46b of the base sheet 46 stretched on the backrest support frame 34. In the state shown in FIG. 3, the side plates 50 can protect the baby from the opposite sides of the baby, and the standing headrest plate 52 can protect the baby's head from behind.

The inclination of the backrest support frame 34 relative to the seat support frame 70 can be adjusted by adjusting the length of the reclining angle adjusting belts 48. When the backrest support frame 34 is swung upward relative to the seat support frame 70 as shown in FIG. 5, the side plates 50 automatically swing upward together with the backrest support frame 34 relative to the seat support frame 70. Since the pins 54 are engaged in the slots 55, the headrest plate 52 is turned clockwise, as viewed in FIG. 3, on the shaft 53 such that the angle between the headrest plate 52 and the backrest support frame 34 increases and the side plates 50 extend parallel to a plane containing the backrest support frame 34. Consequently, the headrest plate 52 becomes substantially flush with the backrest support frame 34 as shown in FIG. 5 and can support the baby's head from behind when the baby is seated on the seat part 46a. When a length of the reclining angle adjusting belts 48 are made longer than that shown in FIG. 5, the backrest support frame 34 and the side plates 50 swing downward simultaneously. At the same time, the headrest plate 52 turns upward and rises relative to the backrest support frame 34 to a position shown in FIG. 3 suitable for protecting the baby's head.

When the stroller 10 is folded in a doubly fold state, the backrest support frame 34 rotates relative to the seat support frame 70 such that the angle between the backrest support frame 34 and the seat support frame 70 increases so that the backrest support frame 34 may not protrude from the folded stroller 10 as shown in FIG. 6. At the same time, the side plates 50 rotate toward the backrest support frame 34 so as to extend parallel to a plane containing the backrest support frame 34. Thus the stroller 10 can be folded in a small size.

The stroller 10 in the first embodiment is foldable and hence the stroller 10 includes many pivotally joined component parts. A folding operation for folding the stroller 10 will be described in connection with arrangements related with the folding operation, although below explanations partially overlap with the explanations stated above.

As shown in FIGS. 1 to 9 and as stated above, the stroller 10 includes: the pair of armrests 16; the connecting rods (connecting member) 17 having the upper end parts pivotally joined to the rear end parts of the armrests 16 for turning about a first axis a; the pair of rear legs 14 having the upper end parts pivotally joined to the armrest 16 for turning about a second axis b and rotatably supporting the rear wheels 13; the pair of front legs 12 having the upper end parts pivotally joined to the armrests 16 for turning about the axis b and rotatably supporting the front wheels 11; the pair of side members (side frames) 24 connecting the middle parts of the front legs 12 and the lower parts of the connecting rods 17 and pivotally joined to the front legs 12 and the connecting rods 17; and the substantially U-shaped handle 15 having both ends connected to the lower parts of the pair of connecting rods 17. The side members 24 are turnable about a third axis c relative to the front legs 12. The side members 24 are turnable about a fourth axis d relative to the connecting rods 17. The handle 15 is turnable abut the fourth axis d relative to the connecting rods 17 and the side members 24. The handle 15 can be set at either of a back side pushing position (a forward pushing position) shown in FIG. 7 and a face side pushing position (a backward pushing position) shown in FIG. 8.

Referring to FIGS. 1 and 7 to 9, the stroller 10 further includes the brackets 19 connecting the middle parts of the rear legs 14 and the lower parts of the connecting rods 17. The brackets 19 are turnable about a fifth axis e relative to the rear legs 14. The brackets 19 are turnable about the fourth axis d relative to the connecting rods 17, the side members 24 and the handle 15. The front upper stay 32 extended between the pair of front legs 12 serve also as a shaft on which the side members 24 and the front legs 12 turn as shown in FIGS. 1 and 7 to 9. The axis of the front upper stay 32 is aligned with the third axis c. The continued ratio of the distances between the axes about which those component parts turns (continued distance ratio) will be described later.

Figure 8:
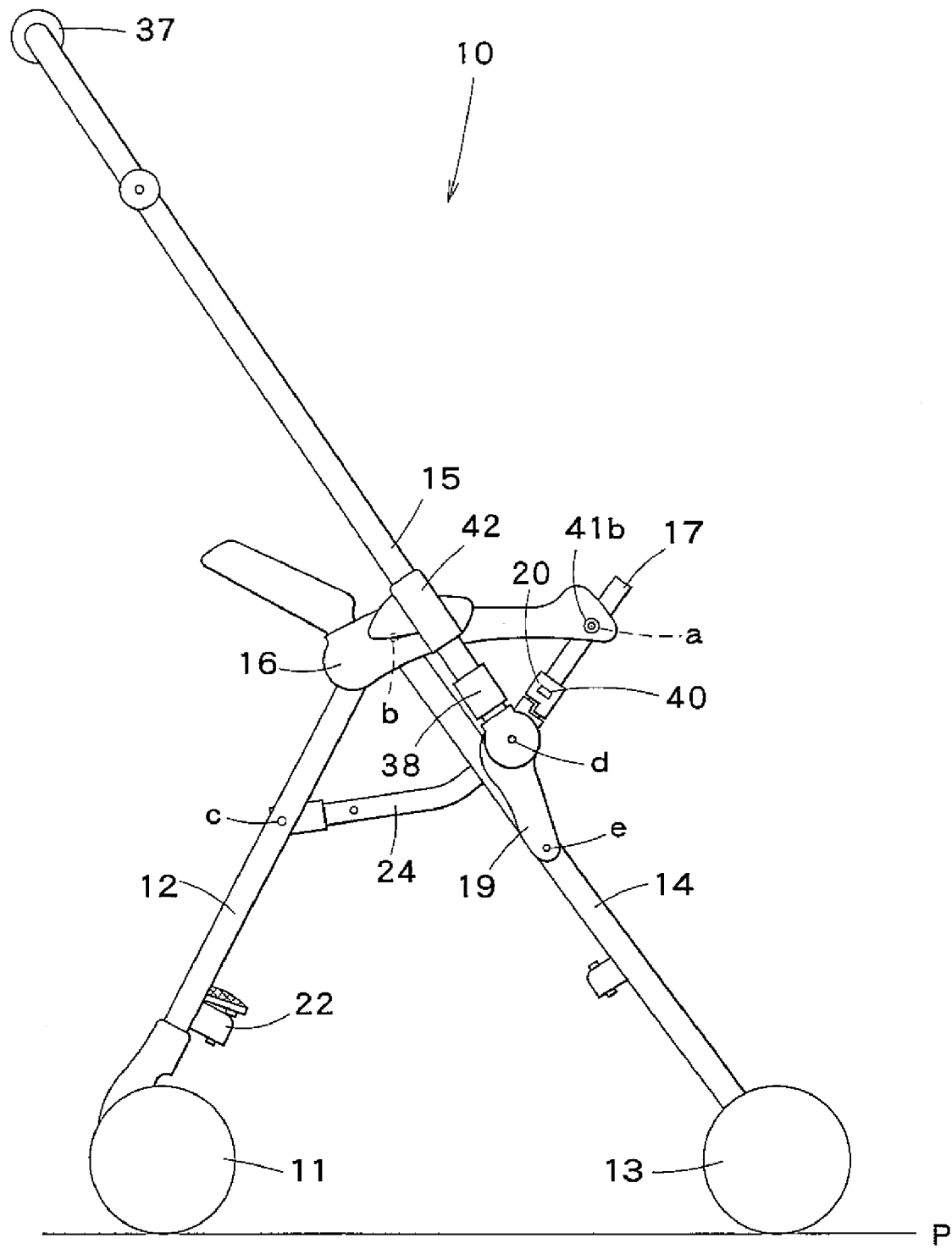
FIG. 8 is a schematic side elevation of the stroller shown in FIG. 1 with the handle set at a face side pushing position.

Referring to FIGS. 1 and 8, the locking members 20 are axially slidably mounted on the lower parts of the connecting rods 17, respectively. The locking members 20 are engaged with the locking parts of the brackets 19 to keep the stroller 10 in an unfolded state. As shown in FIGS. 1 and 8, each of the locking members 20 is provided on its outer surface with an operating lug 40. As shown in FIG. 1, an unlocking member 38 is put on a lower part of each of the side members of the handle 15. The unlocking member 38 is provided with an unlocking rod 39 capable of engaging with the operating lug 40 of the locking member 20. A remote operating mechanism 37 for operating a motion of the unlocking members 38 is mounted on a substantially middle part of the handle 15. The unlocking members 38 are operated so as to slide upward along the side members of the handle 15 by operating the remote operating mechanism 37. When the unlocking members 38 are pulled up, the unlocking rod 39 are engaged with the operating lugs 40, respectively. Consequently, the locking members 20 are pulled up and are disengaged from the brackets 19.

Figure 7:
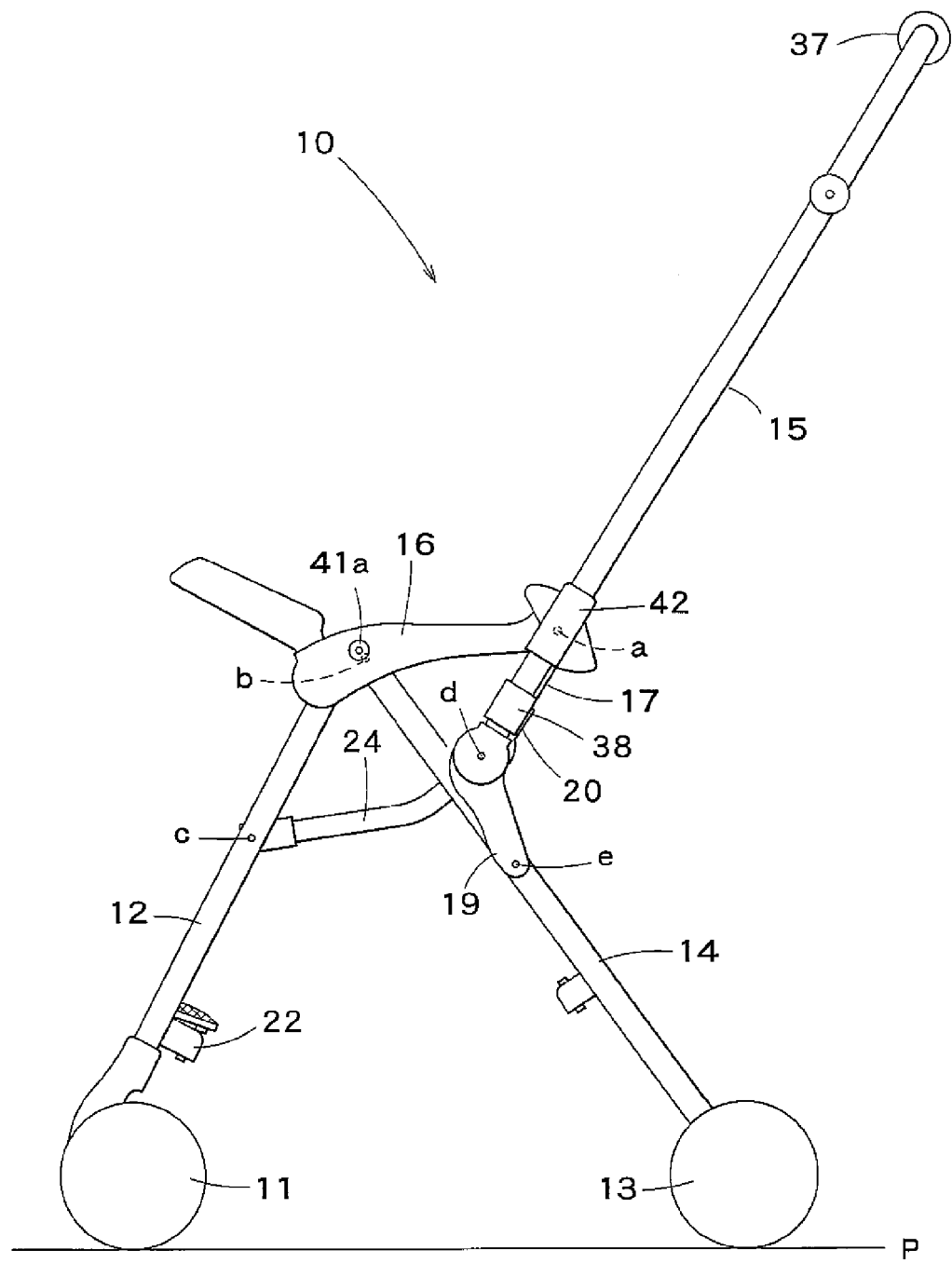
FIG. 7 is a schematic side elevation of the stroller shown in FIG. 1 with a handle set at a back side pushing position.

As shown in FIGS. 1, 7 and 8, stopping members 42 are slidably put on middle parts of the side members of the handle 15. The stopping members 42 can be moved along the side members of the handle 15 by operating the remote operating mechanism 37. As shown in FIGS. 7 and 8, each of the armrests 16 is provided with stopping projections 41a and 41b. The stopping projections 41a and 41b engage with the stopping member 42 to limit the swing of the handle 15 about the fourth axis d. The rear stopping projection 41b (FIG. 8) engages with the stopping member 42 so as to hold the handle 15 at the back side pushing position (the forward pushing position) shown in FIG. 7. When held at the back side pushing position, the side members of the handle 15 are substantially parallel to the connecting rods 17. On the other hand, the front stopping projection 41a (FIG. 7) engages with the stopping member 42 so as to hold the handle 15 at the face side pushing position (the backward pushing position) shown in FIG. 8. When held at the face side pushing position, the side members of the handle 15 are substantially parallel to the rear legs 14.

A folding operation for folding the stroller 10 will be described.

When the handle 15 is set at the face side pushing position, the remote operating mechanism 37 is operated so as to pull up the stopping member 42 and the handle 15 is turned from the face side pushing position shown in FIG. 8 to the back side pushing position shown in FIG. 7.

Figure 9:
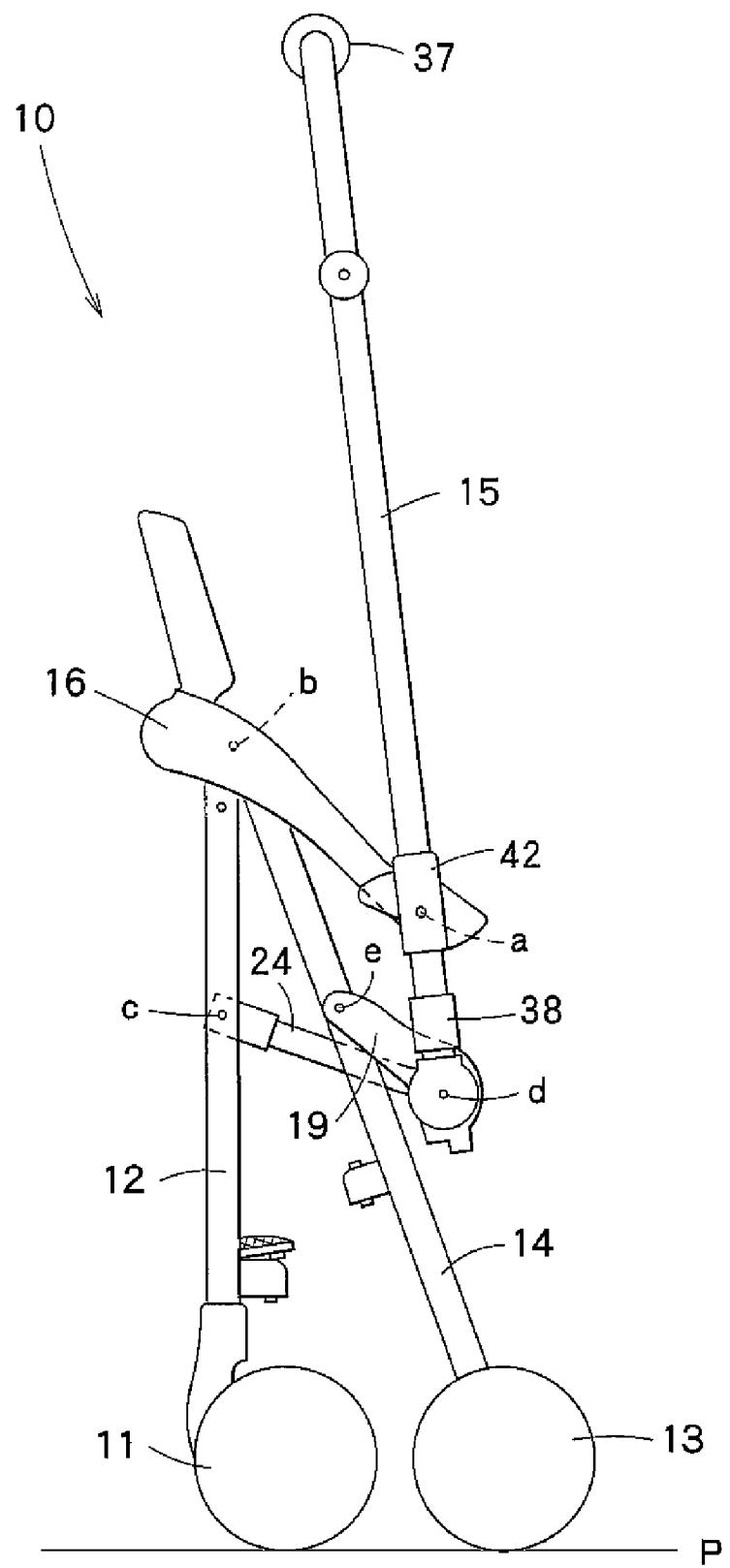
FIG. 9 is a schematic side elevation of the folded stroller shown in FIG. 1.

Then, the locking members 20 are slid by the unlocking members 38 by operating the remote operating mechanism 37 so as to disengage the locking members 20 from the brackets 19. Then, the brackets 19 are turned clockwise, as viewed in FIG. 7, about the fifth axis e. The handle 15 is pulled diagonally upward and backward first such that the first axis a, the fifth axis e and the fourth axis d are arranged on a straight line in a side view along the horizontal direction, and then the handle 15 is pushed down. During these operations, a quadrilateral defined by the first axis a, the second axis b, the third axis c and the fourth axis d in a side view is stretched with respect to directions along one diagonal line extending between a lower left-hand side and an upper right-hand side in FIG. 7 in which the handle 15 is separated from the front legs 12 when the handle 15 is pulled up. Next, the quadrilateral is stretched with respect to directions along the other diagonal line extending between a lower right-hand side and an upper left-hand side in FIG. 7 in which the handle 15 is moved toward the front legs 12 when the handle 15 is pushed down. Thus the handle 15 is extended substantially parallel to the front legs 12 in a side view and the handle 15 is lowered relative to the front legs 12 to fold the stroller in a doubly fold state, as shown in FIG. 9.

A designing procedure for designing the stroller 10 will be described with reference to FIGS. 10(a) and 10(b). In the following description, the continued distance ratio of the distances between the axes a, b, c, d and e will be described in connection with dimensions to be mainly taken into consideration in determining the continued distance ratio.

Figure 10:
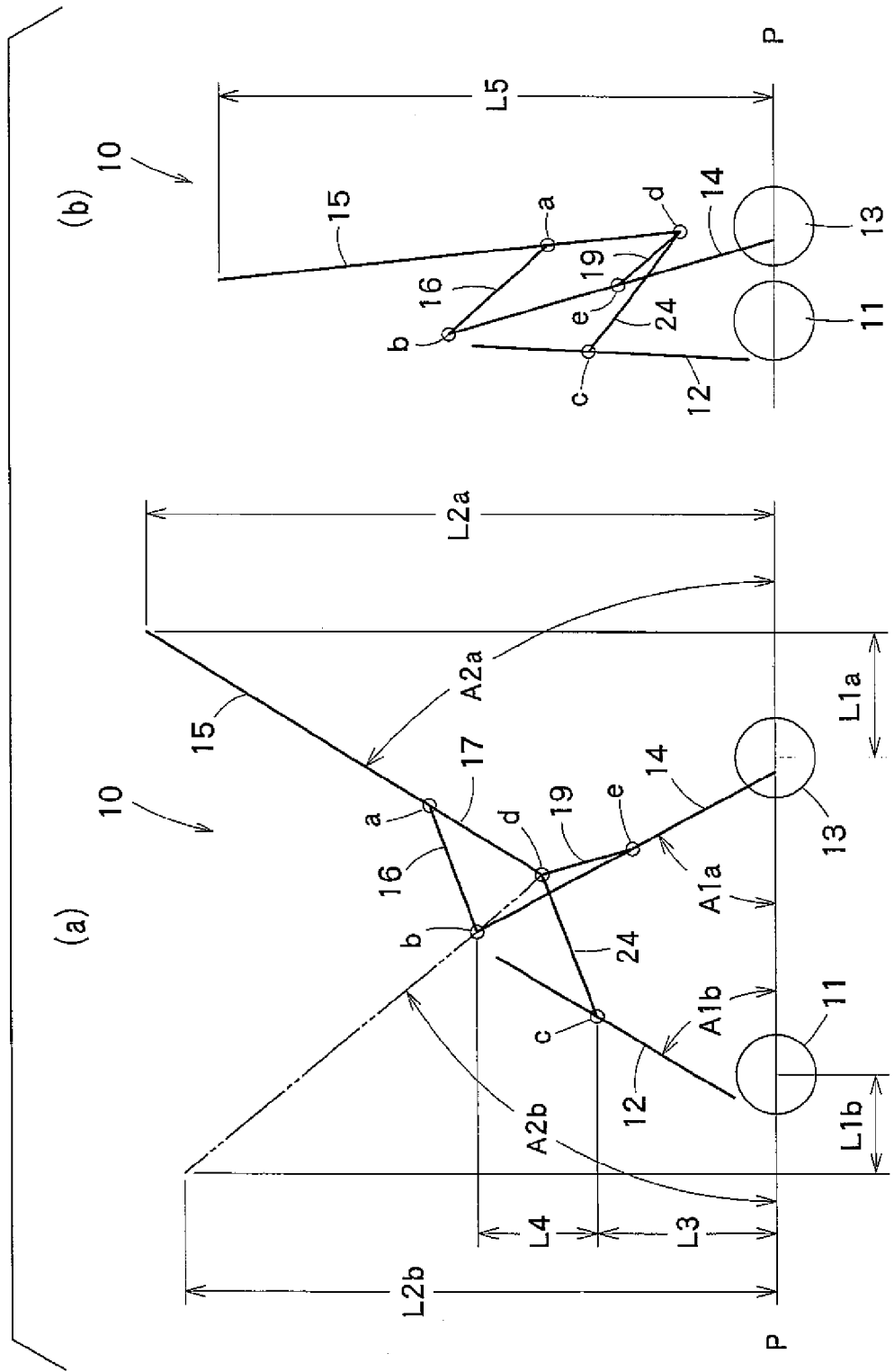
FIGS. 10(a) and 10(b) are diagrammatic views of the stroller shown in FIG. 1 in an unfolded state and in a folded state, respectively, for explaining a designing procedure for designing the stroller shown in FIG. 1.

Referring to FIG. 10(a), it is effective to determine properly the horizontal distance L1a (the horizontal distance L1a between the axis of the rear wheels 13 and the top of the handle 15 with respect to the unfolded stroller 10, in a side view along the horizontal direction); the horizontal distance L1b (the horizontal distance L1b between the axis of the front wheels 11 and the top of the handle 15 with respect to the unfolded stroller 10, in a side view along the horizontal direction); the vertical distance L2a (the vertical distance L2a between the axis of the rear wheels 13 and the top of the handle 15 with respect to the unfolded stroller 10, in a side view along the horizontal direction); the vertical distance L2b (the vertical distance L2a between the axis of the front wheels 11 and the top of the handle 15 with respect to the unfolded stroller 10, in a side view along the horizontal direction); the vertical distance L3 (the vertical distance L3 between the axes of the front wheels 11 and the rear wheels 13 and the third axis c with respect to the unfolded stroller 10, in a side view along the horizontal direction); and the vertical distance L4 (the vertical distance L4 between the second axis b and the third axis c with respect to the unfolded stroller 10, in a side view along the horizontal direction), in order to improve the operability, safety, running stability and comfortableness (ride comfort) of the unfolded stroller 10. The horizontal distances L1a and L1b need to be properly determined individually for a condition where the handle 15 is at the back side pushing position and a condition where the handle 15 is set at the face side pushing position. The vertical distances L2a and L2b need to be properly determined individually for a condition where the handle 15 is at the back side pushing position and a condition where the handle 15 is set at the face side pushing position. The operability, safety, running stability and comfortableness (ride comfort) of the unfolded stroller 10 can be further improved by properly determining the angle A1a (the angle A1a between the rear legs 14 and a surface P on which the stroller 10 is placed (hereinafter referred to as "the ground surface P") with respect to the unfolded stroller 10, in a side view along the horizontal direction); the angle A1b (the angle A1b between the front legs 12 and the ground surface P with respect to the unfolded stroller 10, in a side view along the horizontal direction); the angle A2a (the angle A2a between the handle 15 set at the back side pushing position and the ground surface P with respect to the unfolded stroller 10, in a side view along the horizontal direction); and the angle A2b (the angle A2b between the handle 15 set at the backward pushing position and the ground surface P with respect to the unfolded stroller 10, in a side view along the horizontal direction).

It is possible that the user's feed strike against the rear wheel 13 and the user is unable to operate the stroller 10 easily if the horizontal distance L1a is excessively short, and it is possible that the user's feed strike against the front wheel 11 and the user is unable to operate the stroller 10 easily if the horizontal distance L1b is excessively short. On the other hand, the user's force cannot be transmitted through the handle 15 to the wheels 11 and 13 as the user desires if the horizontal distances L1a and L1b are excessively long and, consequently, the stroller 10 cannot be easily operated. Furthermore, it is possible that the front wheels 11 are lifted up from the ground surface P when the handle 15 is at the back side pushing position or the rear wheels 13 are lifted up from the ground surface P when the handle 15 is set at the face side pushing position if the horizontal distances L1a and L1b are excessively long. Thus the operability and the running stability of the stroller 10 are deteriorated if the horizontal distances L1a and L1b are excessively long. The operability of the stroller 10 is also unsatisfactory when the vertical distances L2a and L2b are either excessively short or excessively long.

The angle A2a between the handle 15 set at the back side pushing position and the ground surface P; the angle A2b between the handle 15 set at the face side pushing position and the ground surface P; the length of the handle 15; the angle A1b between the front legs 12 and the ground surface P; the angle A1a between the rear legs 14 and the ground surface P; and the respective lengths of the legs 12 and 14 need to be properly adjusted taking into consideration the mutual influences of those factors, in order to determine properly these distance L1a, L1b, L2a, and L2b.

Usually, the handle 15 of the stroller 10 set at the back side pushing position overlaps the connecting rods 17 and the side members of the handle 15 are substantially parallel to the connecting rods 17 in a side view, as applied in this embodiment. The handle 15 and the connecting rods 17 are arranged in such an arrangement because the locking members 20 are moved along the connecting rods 17 by moving the unlocking members 38 along the side members of the handle 15 in order to disengage the locking members 20 from the brackets 19. Thus the angle A2a between the handle 15 set at the back side pushing position and the ground surface P is substantially equal to the angle between the connecting rods 17 and the ground surface P. Therefore, the adjustment of the angle A2a between the handle 15 set at the back side pushing position and the ground surface P involves the adjustment of the angle between the connecting rods 17 and the ground surface P.

The front end part of the seat on which the baby is seated is supported on the side members 24 or the front legs 12. In the stroller 10 in this embodiment, it is particularly preferable that the front end part of the seat is supported directly on the front upper stay 32 extended between the side members 24 and having an axis coinciding with the third axis c, in order to avoid increasing the number of component parts as well as in order to improve stability by direct support. As a result of this, in this embodiment, the vertical distance L3 between the third axis c and the horizontal plane containing the axes of the wheels 11 and 13 in a side view corresponds to the height of the seat from the plane containing the axes of the wheels 11 and 13, and the vertical distance L4 between the second axis b and the third axis c in a side view corresponds to the height of the armrests 16 from the seat.

Accordingly, if the vertical distance L3 between the plane containing the axes of the wheels 11 and 13 and the third axis c is excessively short, the baby seated on the seat needs to bend the legs, which deteriorates seat comfort (comfortableness). On the other hand, if the vertical distance L3 is excessively long, it is difficult for the baby to get on and get off the stroller 10, and seat comfort (comfortableness) and safety deteriorate.

If the vertical distance L4 between the second axis b and the third axis c in a side view is excessively long, the height of the armrests 16 relative to the baby seated on the seat of the stroller 10 is excessively high, which gives the baby an oppressive feeling and deteriorates ride comfort (comfortableness). If the vertical distance L4 is excessively short, the height of the armrests 16 relative to the baby seated on the seat of the stroller is excessively low, which will deteriorate safety as well as comfortableness.

The respective heights of the second axis b and the third axis c need to be adjusted in order to determine the vertical distances L3 and L4 properly.

Concerning the angle A1a between the rear legs 14 and the ground plane P and the angle A1b between the front legs 12 and the ground plane P are excessively large, if these angles A1a and A1b are excessively large, the front legs 12 and the rear legs 14 rise sharply from the ground surface P and the running of the stroller 10 is unstable. On the other hand, these angles A1a and A1b are excessively large, the unfolded stroller 10 has a big longitudinal dimension and is large. In this case, the stroller 10 cannot be turned along a small circle, and the operability of the stroller 10 is also unsatisfactory.

Concerning the angles A2a and A2b between both of the handle 15 and connecting rod 17 and the ground plane P, if these angles A2a and A2b are excessively large, the side members of the handle 15 extend beside the baby on the stroller 10 and give the baby an oppressive feeling, in particular when the handle 15 is set at the back side pushing position. Hence, in this case, the ride comfort (comfortableness) is unsatisfactory. On the other hand, if these angles A2a and A2b are excessively large, the distances L1a, L1b, L2a and L2b cannot be properly adjusted.

The desired abilities of the stroller can be improved by properly adjusting the distances L1a, L1b, L2a, L2b L3 and L4 and the angles A1a, A1b, A2a and A2b. For example, the distances L1a, L1b, L2a, L2b L3 and L4 and the angles A1a, A1b, A2a and A2b influence mutually like the angles A2a and A2b influence the distances L1a, L1b, L2a and L2b as mentioned above because the component members are pivotally joined to each other for turning (rotating, swinging) about the axes a, b, c, d and e in order to make the stroller 10 foldable. The distances between the adjacent ones of the axes a, b, c, d and e needs to be properly adjusted to determine the distances L1a, L1b, L2a, L2b L3 and L4 and the angles A1a, A1b, A2a and A2b properly simultaneously.

In addition, it is particularly important for the foldable stroller 10 to be folded in a small size. Therefore, it is preferable that a vertical distance L5 (the vertical distance L5 between the horizontal plane containing the axes of the wheels 11 and 13 and the top of the handle 15 with respect to the folded stroller, in a side view along the horizontal direction) is short when the stroller 10 is folded as shown in FIG. 10(b). The distance L5 is short when a quadrilateral defined by the axes a, b, c and d in a side view can be stretched with respect to directions along one diagonal line extending between an upper left-hand side and a lower right-hand side in FIG. 10(b). When the quadrilateral can be thus deformed, the front legs 12, the connecting rods 17 and the handle 15 can be arranged closely with respect to forward/rearward directions and the stroller 10 can be folded in a small longitudinal dimension (forward/rearward dimension). The stroller 10 can be folded in a small size when the quadrilateral defined by the axes a, b, c and d can be property deformed.

The inventors of the present invention examined strollers respectively having different continuous distance ratios of the distances between the axes a, b, c, d and e. As a result of these examinations, the inventors found that the stroller 10 can be folded in a small size and both the lengths L1a, L1b, L2a, L2b, L3, L4 and L5 and the angles A1a, A1b, A2a and A2b can be properly determined when the distance A between the first axis a and the second axis b, the distance B between the second axis b and the third axis c, the distance C between the third axis c and the fourth axis d and the distance D between the fourth axis d and the first axis a meet a condition expressed by Expression (1).

That is to say, the inventors found that the stroller 10 can be folded in a small size without enlarging the stroller 10 and without increasing the number of component parts, and the operability, safety, running stability and comfortableness (ride comfort) of the stroller 10 can be improved when the distances A, B, C and D meet Expression (1).

The continued distance ratio of the distances A, B, C and D expressed by expression (1) may be correct to nearest tenth.

$$A:B:C:D=1.5:1.6:1.7:1.5 \quad (1)$$

The inventors found that the unfolded stroller 10 meeting Expression (1) is particularly desirable when, with respect to the unfolded stroller, the angle A2a between the handle 15 set at the back side pushing position (and the connecting rods 17) and the ground surface P in a side view is between 53° and 63°, more preferably, 56° and 60°, and the angle A1b between the front legs 12 and the ground surface P in a side view is between 54° and 64°, more preferably, 57° and 61°. The front legs 12 of this stroller 10 inclined at the proper angle A1b to the ground surface P can contribute particularly to improving the running stability of the stroller 10. The handle at the back side pushing position and the connecting rods 17 inclined at the proper angle A2a to the ground surface P can contribute particularly to improving the comfortableness of the stroller 10. Since the angle between the front legs 12 and the connecting rods 17 is fixed in the state where the stroller is unfolded, the shape of the quadrilateral defined by the first axis a, the second axis b, the third axis c and the fourth axis d in a side view is determined.

Under those conditions, safety can be particularly improved by properly determining the vertical distance L4 between the front end part of the seat supported on the front upper stay 32 and the armrests 16. In addition, safety and comfortableness can be particularly improved by properly determining the vertical distance L3, namely, the height of the seat.

Preferably, the angle A1a between the rear legs 14 and the ground surface P when the stroller 10 is unfolded is between 56° and 66°, more preferably, 59° and 63°, in a side view, in addition to meeting the foregoing conditions. Running stability can be particularly improved by properly determining the angle A1a between the rear legs 14 and the ground surface P. The vertical distances L3 and L4, the horizontal distances L1a and L1b, and the vertical distance L5 can be properly determined by adjusting the respective lengths of the front legs 12, the rear legs 14 and the handle 15.

Only the angle A2b between the handle 15 set at the face side pushing position and the ground surface P can be adjusted by adjusting the position of the stopping projection 41a attached to the front end part of each of the armrests 16 with respect to the longitudinal direction. In the stroller 10 meeting the condition expressed by Expression (1), when the angle A2b between the handle 15 set at the face side pushing position and the ground surface P is adjusted to an angle between 45° and 55°, more preferably, between 48° and 52°, the horizontal distance L1b and the vertical distance L2b can be properly determined without adversely affecting to other distances to be token part in, especially to the horizontal distance L1a and the vertical distance L2a. That is to say, the height of the handle 15 set at the face side pushing position and the horizontal distance between the upper end of the handle 15 set at the face side pushing position and the front wheels can be properly determined, so that the operability of the stroller 10 with the hand 15 set at the face side pushing position can be improved.

As mentioned above, in order to fold the stroller 10, the handle 15 is pulled diagonally upward and backward first such that the first axis a, the fifth axis e and the fourth axis d are arranged on a straight line in a side view, and then the handle 15 is pushed down so as to turn the brackets 19 clockwise about the fifth axis e. Therefore, the handle 15 needs to be pulled up for a long distance and hence the stroller cannot be easily folded if the distance between the fourth axis d and the fifth axis e is increased.

The operability of the stroller 10 in folding the stroller 10 can be improved by adjusting the position of the fifth axis e relative to the axes a, b, c and d in addition to properly determining the continued distance ratio of the distances between the axes a, b, c and d.

The inventors of the present invention conducted experiments for various continued distance ratios of the distances between the axes a, b, c, d and e. It was found through the experiments that the distances L1a, L1b, L2a, L2b, L3, L4 and L5 and the angles A1a, A1b, A2a and A2b can be simultaneously properly determined and the folding operability of the stroller 10 is satisfactory when the distance A between the first axis a and the second axis b, the distance B between the second axis b and the third axis c, the distance C between the third axis c and the fourth axis d, the distance D between the fourth axis d and the first axis a, the distance E between the second axis b and the fifth axis e and the distance F between the fourth d and the fifth axis e meet a condition expressed by Expression (2). That is to say, it was found that the stroller 10 can be folded in a small size without enlarging the stroller 10 and without increasing the number of component parts, the operability, safety, running stability and comfortableness (ride comfort) of the stroller 10 can be improved and the stroller 10 can be easily folded when the continued distance ratio of the distances between the axes a, b, c, d and e meets Expression (2). The continued distance ratio of the distances A, B, C, D, E and F expressed by Expression (2) may be correct to nearest tenth.

$$A:B:C:D:E:F=1.5:1.6:1.7:1.5:1.9:1.0 \quad (2)$$

It was also found that it is very preferable that, in the unfolded stroller 10 meeting the condition expressed by Expression (2), the angle A2a between the handle 15 set at the back side pushing position (and the connecting rods 17) and the ground surface P in a side view is between 53° and 63°, more preferably, 56°, and 60°, and the angle A1a between the rear legs 14 and the ground surface P is between 56° and 66°, more preferably, 59° and 63°.

The rear legs 14 inclined at the proper angle A1a to the ground surface P can contribute particularly to improving the running stability of the stroller 10. In addition, the handle 15 set at the back side pushing position and the connecting rods 17 inclined at the proper angle A2a to the ground surface P can contribute particularly to improving the comfortableness of the stroller 10. Since the angle between the rear legs 14 and the connecting rods 17 is fixed in the state where the stroller is unfolded, the shape of the quadrilateral defined by the first axis a, the second axis b, the fifth axis e and the fourth axis d in a side view is determined. As a result of this, the shape of the quadrilateral defined by the axes a, b, c and d when the stroller 10 is unfolded can be determined. Consequently, the angle A1b between the front legs 12 and the ground surface P can be properly determined so that running stability may be improved. The other important distances and angles can be simultaneously properly determined by adjusting the respective lengths, in a side view along the horizontal direction, of the front legs 12, the rear legs 14 and the handle 15.

As apparent from the foregoing description, it is preferable that the distance A between the first axis a and the second axis b, the distance B between the second axis b and the third axis c, the distance C between the third axis c and the fourth axis d and the distance D between the fourth axis d and the first axis a are determined such that the continued distance ratio expressed by Expression (1) are fulfilled when the ratio is rounded off to 1 decimal place. The operability, safety, running stability and comfortableness (ride comfort) of the stroller 10 thus built are satisfactory and the stroller 10 can be folded in a small size.

It is preferable that in the state where the stroller is unfolded, the handle 15 set at the back side pushing position and the connecting rods 17 are inclined at an angle between 53° and 63° to the ground surface P, and the front legs 12 are inclined at an angle between 54° and 64° to the ground surface P. Since the angle A1b between the front legs 12 of the stroller 10 and the ground surface P is determined properly, the running stability of the stroller 10, in particular, is satisfactory. Since the angle A2a between the handle 15 (and the connecting rods 17) relative to the ground surface P is determined properly, an oppressive feeling is reduced and comfortableness, in particular can be improved. When the front end part of the seat is supported on the front upper stay 32 aligned with the third axis c, the height of the seat can be properly adjusted by adjusting the length of the front legs 12, whereby the safety and comfortableness of the stroller 12 can be particularly improved. Moreover, the vertical distance between the seat and the armrests 16, in the state where the stroller is unfolded, can be properly determined, whereby the safety of the stroller 10 can be further improved. Furthermore, operability can be further improved by properly determining the length of the handle 15.

Preferably, in the state where the stroller is unfolded, the rear legs 14 are inclined at an angle between 56° and 66° relative to the ground surface P on which the unfolded stroller 10 is placed. In this stroller 10, the angle A1a between the rear legs 14 and the ground surface P is properly determined, running stability can be particularly improved. In addition, in the above structure, the horizontal distance between the axis of the rear wheels 13 and the upper end of the handle 15 can be properly adjusted by properly determining the length of the handle 15 inclined at the proper angle A2a relative to the ground surface P in the back side pushing position, and properly adjusting the length of the rear legs 14, whereby operability can be further improved.

The stroller 10 is designed so that the distance A between the first axis a and the second axis b, the distance B between the second axis b and the third axis c, the distance C between the third axis c and the fourth axis d, the distance D between the fourth axis d and the first axis a, the distance E between the second axis b and the fifth axis e, and the distance F between the fourth axis d and the fifth axis e may meet a continued distance ratio expressed by Expression (2) which is rounded off to 1 decimal place. In the stroller 10, the position of the fifth axis e is determined properly and hence folding operability can be improved.

It is preferable that, in the state where the stroller 10 is unfolded, the angle A2a between the handle 15 set at the back side pushing position and the ground surface P on which the stroller 10 is placed in a side view is between 53° and 63°, and the angle A1a between the rear legs 14 and the ground surface P on which the stroller 10 is placed in a side view is between 56° and 66°. The rear legs inclined at the proper angle relative to the ground surface P can contribute particularly to improving the running stability of the stroller 10. The handle 15 set at the back side pushing position and the connecting rods inclined at the proper angle A2a relative to the ground surface P reduce an oppressive feeling and can contribute particularly to improving the comfortableness of the stroller 10. When the angle between the rear legs 14 and the connecting rods 17 is determined, the angle A1b between the front legs 12 and the ground surface P is dependent on the continued distance ratio of the distances between the axes a, b, c, d and e. The angle A1b is determined properly so as to improve the running stability of the stroller 10 particularly. When the front end part of the seat is supported on the front upper stay 32 aligned with the third axis c, the height of the seat can be properly adjusted by adjusting the length of the front legs 12, whereby the safety and comfortableness of the stroller 10 can be particularly improved. Moreover, the vertical distance between the seat and the armrests 16 in the state where the stroller 10 is unfolded can be properly determined, whereby the safety of the stroller 10 can be further improved. Furthermore, the operability of the stroller 10 can be further improved by adjusting the respective lengths of the rear legs 14 and the handle 15 so that the horizontal distance between the rear legs 14 and the upper end of the handle 15 may be properly adjusted.

Various changes and variations are possible in the foregoing embodiment without departing from the scope of the present invention. Some modifications will be described by way of example.

Both the front legs 12 and the rear legs 14 turn about the second axis b relative to the armrests 16 in the stroller 10 in the first embodiment, an axis about which the front legs 12 turn relative to the arm rests 16 may be near the second axis b on which the rear legs 14 turn relative to the armrests 16 or may be spaced forward slightly from the second axis b with respect to longitudinal directions. The same operations and effects can be achieved, provided that the axis about which the front legs 12 turn relative to the armrests 16 is near the second axis b.

Figure 11:
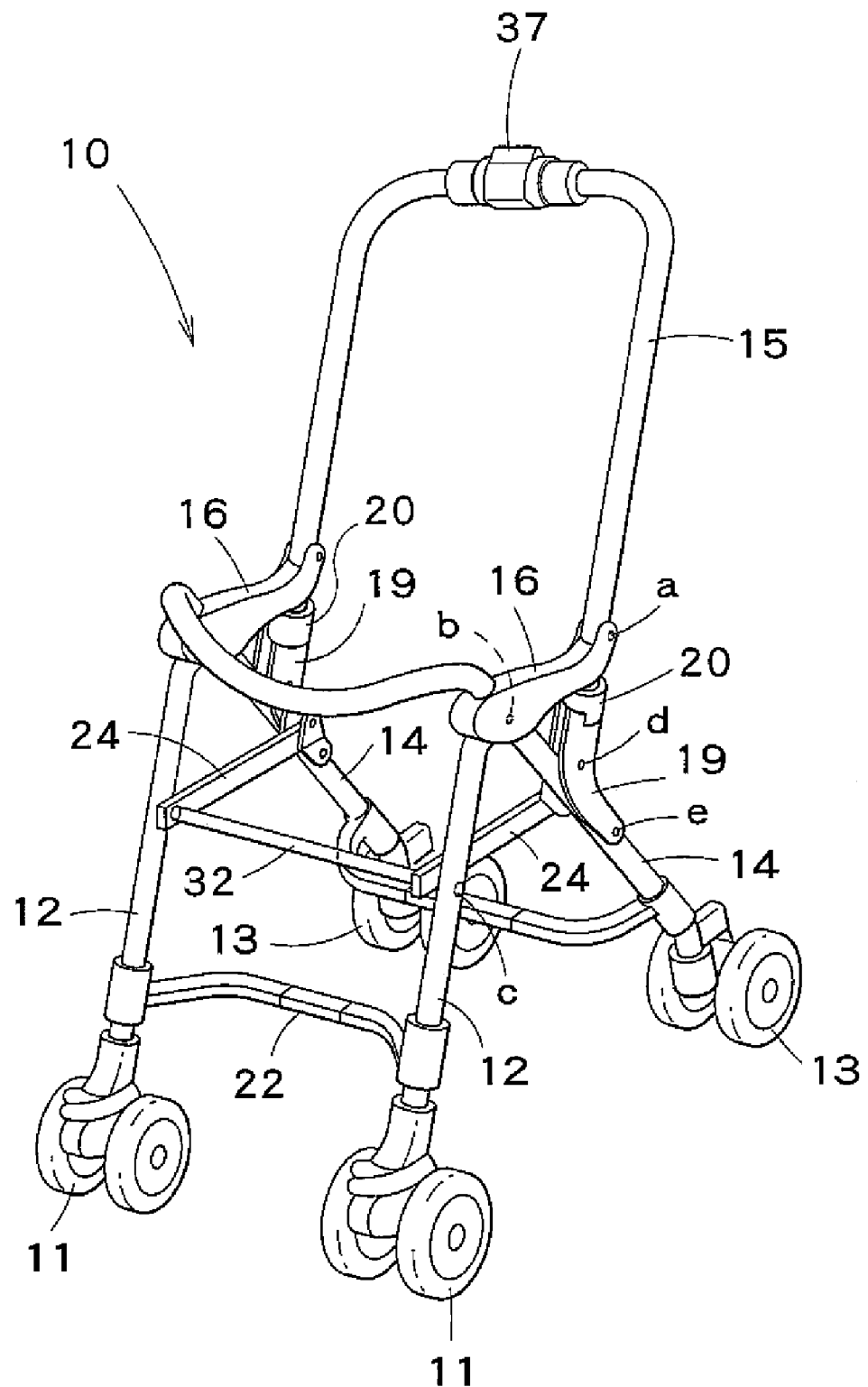
FIG. 11 is a perspective view of a stroller in a second embodiment according to the present invention.
Figure 12:
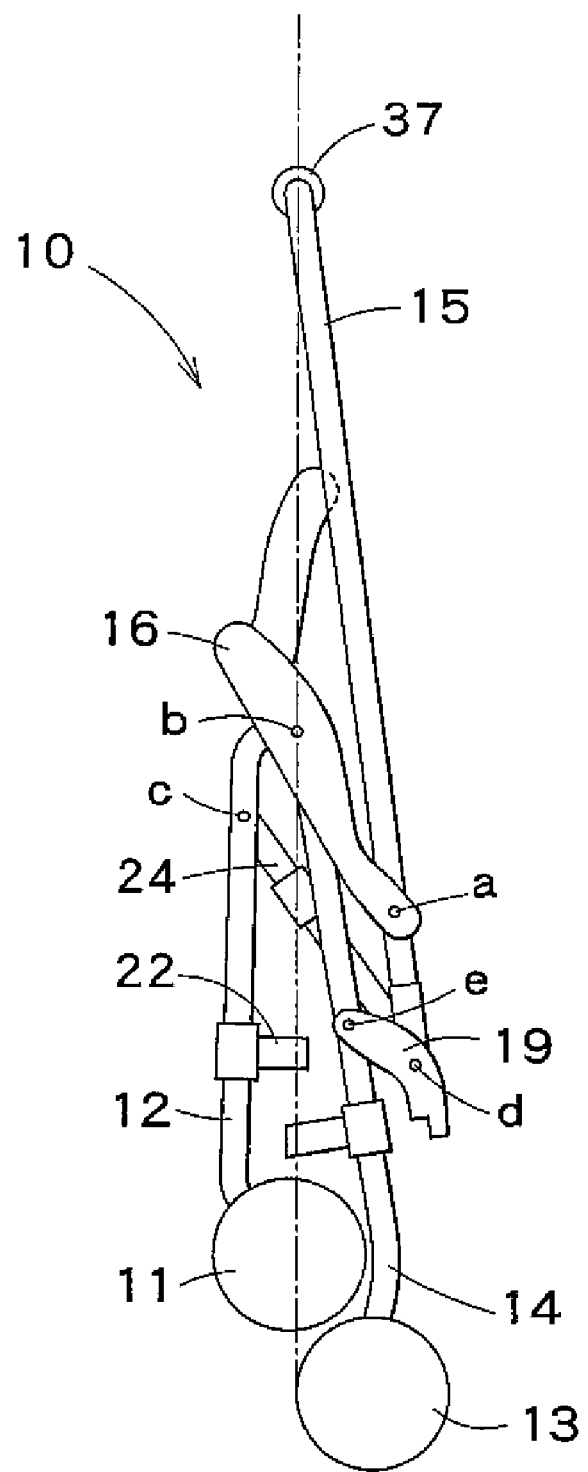
FIG. 12 is a side elevation of the folded stroller shown in FIG. 11.

Although the description has been made of properly determining the continued distance ratio of the distances between the axes a, b, c, d and e in the stroller 10 provided with the handle 15 capable of being turned between the back side pushing position and the face side pushing position. However, the present invention is not limited thereto in its practical application. For example, the structure including the seat support frame 70, the backrest support frame 34, the side plates 50 and the headrest plate 52 shown principally in FIGS. 1 to 5 can be applied to a foldable stroller 10 with a handle 15 that cannot be turned to a face side pushing position (a backward pushing position) as shown in FIGS. 11 and 12. The continued distance ratio of the distances between the axes and the respective inclinations of the handle 15 and such to the ground surface P mentioned above may be applied to a foldable stroller 10 provided with a handle 15 that cannot be turned to a face side pushing position (a backward pushing position). In this case, the operability, safety, running stability, comfortableness (ride comfort) and folding operability of the stroller 10 shown in FIGS. 11 and 12 can be improved without enlarging the stroller 10 and without increasing the number of component parts. Moreover, the stroller 10 shown in FIGS. 11 and 12 can be folded in a small size.

The stroller 10 shown in FIGS. 11 and 12 does not have any members corresponding to the connecting rods 17, and lower parts of the handle 15 provided with locking members 20 capable of engaging with brackets 19 are extended so as to take the place of the connecting rods 17. The locking members 20 can be disengaged from the brackets 19 by operating a remote operating mechanism 37 mounted on an upper member of the handle 15 so as to pull up the locking members 20 along the side members of the handle 15. The rest of the members of the stroller 10 shown in FIGS. 11 and 12 can be the same as those of the stroller 10 described in connection with FIGS. 1 to 9. Hence, parts of the stroller 10 shown in FIGS. 11 and 12 like or corresponding to those of the stroller 10 shown in FIGS. 1 to 9 are designated by the same reference characters and the description thereof will be omitted.

EXAMPLE

A concrete example of the stroller according to the present invention will be described.

A stroller shown in FIGS. 1 to 9 having axes at distances meeting Expressions (1) and (2) from each other was fabricated. Measured lengths and angles shown in FIGS. 10(a) and 10(b) are shown below.

A (First axis-Second axis distance): 199.0 mm
B (Second axis-Third axis distance): 210.6 mm
C (Third axis-Fourth axis distance): 223.4 mm
D (Fourth axis-First axis distance): 192.4 mm
E (Second axis-Fifth axis distance): 238.7 mm
F (Fourth axis-Fifth axis distance): 131.0 mm
L1a: 190.5 mm
L1b: 90.0 mm
L2a: 924.1 mm
L2b: 865.1 mm¥ L3: 263.4 mm
L4: 168.9 mm
A1a: 60.8°
A1b: 59.1°
A2a: 58.0°
A2b: 49.7°

The stroller could be folded in a very small size and was excellent in operability, safety, running stability, comfortableness (ride comfort) and folding operability.

What is claimed is:

1. A stroller, comprising:
   a leg;
   seat support frame connected to the leg;
   a backrest support frame connected to the seat support frame;
   a headrest plate connected to an upper part of the backrest support frame; and
   a pair of side plates disposed on the opposite sides, respectively, of the backrest support frame, the side plates being positioned above the backrest support frame, respectively so as to protect a baby to be seated on the stroller from the side of the baby,
   wherein the side plates are connected to both the seat support frame and the headrest plate so as to be turnable, and the backrest support frame is connected to both the seat support frame and the headrest plate so as to be turnable; and
   wherein the side plates are configured to turn the headrest plate relative to the backrest support frame while turning the backrest support frame relative to the sear support frame.

2. The stroller according to claim 1, wherein an axis about which the side plates turn relative to the seat support frame is positioned at a level higher than a level at which an axis about which the backrest support frame turns relative to the seat support frame is positioned.

3. The stroller according to claim 1, wherein pins are projected transversely from one of the headrest plate and the side plates, and the other of the side plates and the headrest plate are provided with slots in which the pins engage.

4. The stroller according to claim 1 further comprising a base sheet supported by the seat support frame and the backrest support frame.

5. The stroller according to claim 4, wherein the backrest frame includes a pair of side frame parts, and a connecting frame part connecting the pair of side frame parts, and
   the base sheet is mounted on the seat support frame, the pair of side frame parts and the connecting frame part so as to be stretched tautly.

6. The stroller according to claim 4, wherein the seat support frame includes a pair of side members connected to the leg, and a front upper stay connecting the pair of side members,
   the backrest support frame includes a pair of side frame parts and a connecting frame part connecting the pair of side frame parts, and
   the base sheet is mounted on the pair of side members, the front upper stay, the pair of side frame parts and the connecting frame part so as to be stretched tautly.

7. The stroller according to claim 6 further comprising:
   a rear upper stay connecting the pair of side members at a position behind the front upper stay; and
   a tightening member mounted on the rear upper stay and attached to the base sheet.

8. The stroller according to claim 7, wherein the backrest support frame is connected to the seat support frame so as to be turnable, and the rear upper stay is positioned below an axis about which the backrest support frame turns relative to the seat support frame in a state where the stroller is unfolded.

9. A stroller comprising:

a leg;

a seat support frame connected to the leg;

a U-shaped backrest support frame connected to the seat support frame so as to be turnable; and a base sheet supported by the seat support frame and the backrest support frame, wherein the seat support frame includes a pair of side members connected to the leg, and a front upper stay connecting the pair of side frames;

wherein the backrest support frame includes a pair of side frame parts and a connecting frame part connecting the pair of side frame parts;

wherein the base sheet is mounted on the pair of side members, the front upper stay, the pair of side frame parts and the connecting frame part so as to be stretched tautly; and wherein a rear upper stay connecting the pair of side members at a position behind the front upper stay and apart from the base sheet; and a tightening member mounted on the rear upper stay and attached to the base sheet so as to connect the base sheet with the rear upper stay.

10. The stroller according to claim 9, wherein the backrest support frame is connected to the seat support frame so as to be turnable, and the rear upper stay is positioned below an axis about which the backrest support frame turns relative to the seat support frame in a state where the stroller is unfolded.

* * * * *